Figure 12:
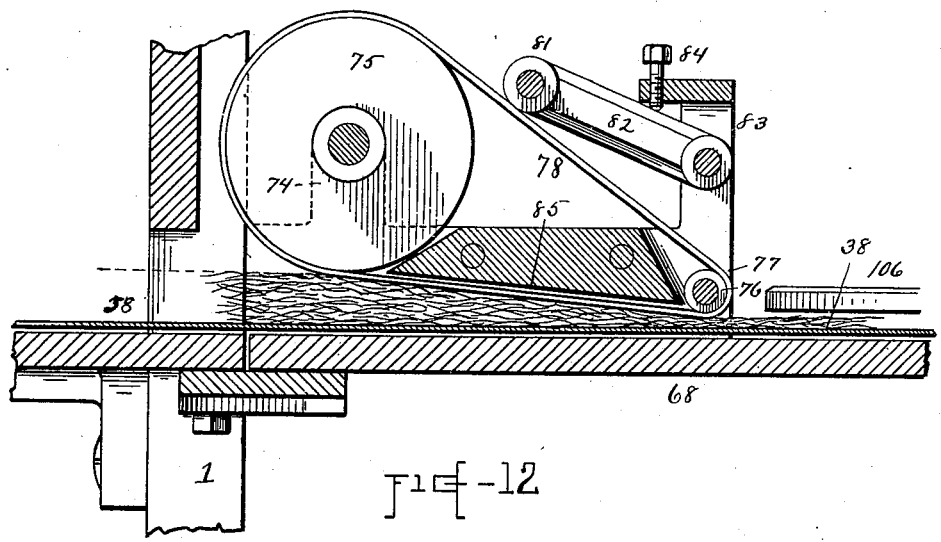

No. 639,677. Patented Dec. 19, 1899.
E. T. GILLILAND.
MACHINE FOR MAKING CIGARETTES.
(Application filed Feb. 1, 1898.)
(No Model.) 22 Sheets—Sheet 1.
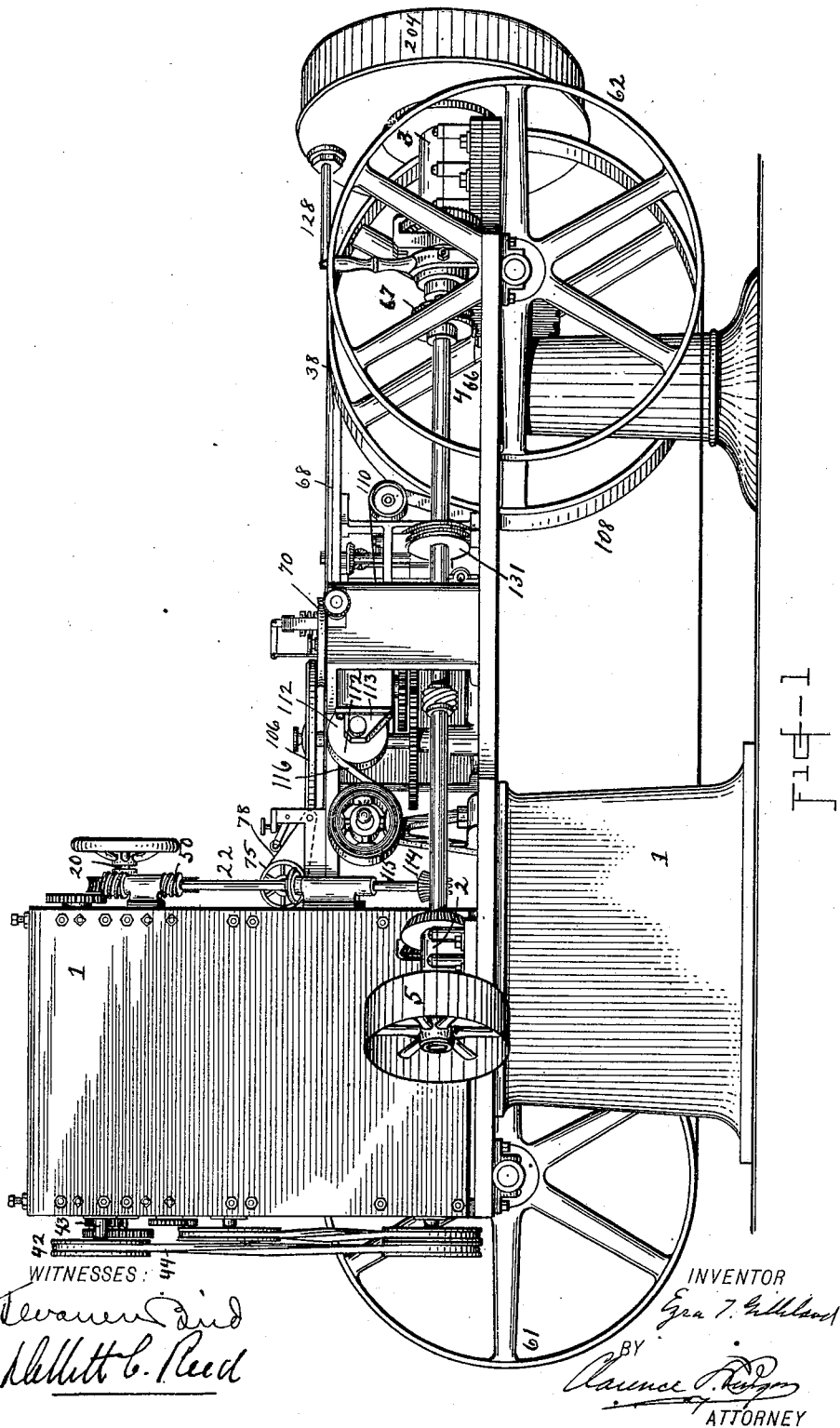

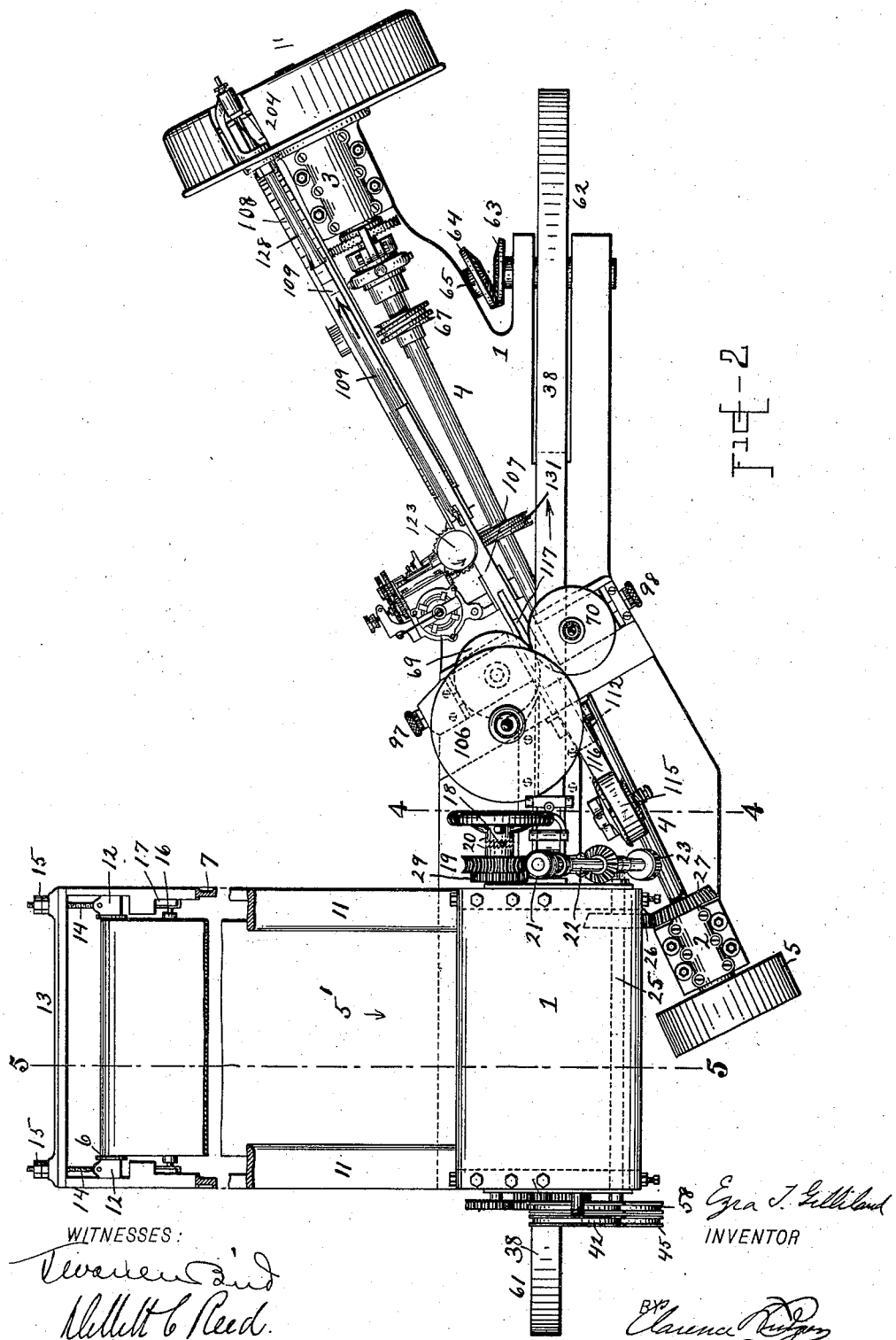

No. 639,677. Patented Dec. 19, 1899.
E. T. GILLILAND.
MACHINE FOR MAKING CIGARETTES.
(Application filed Feb. 1, 1898.)
(No Model.) 22 Sheets—Sheet 3.
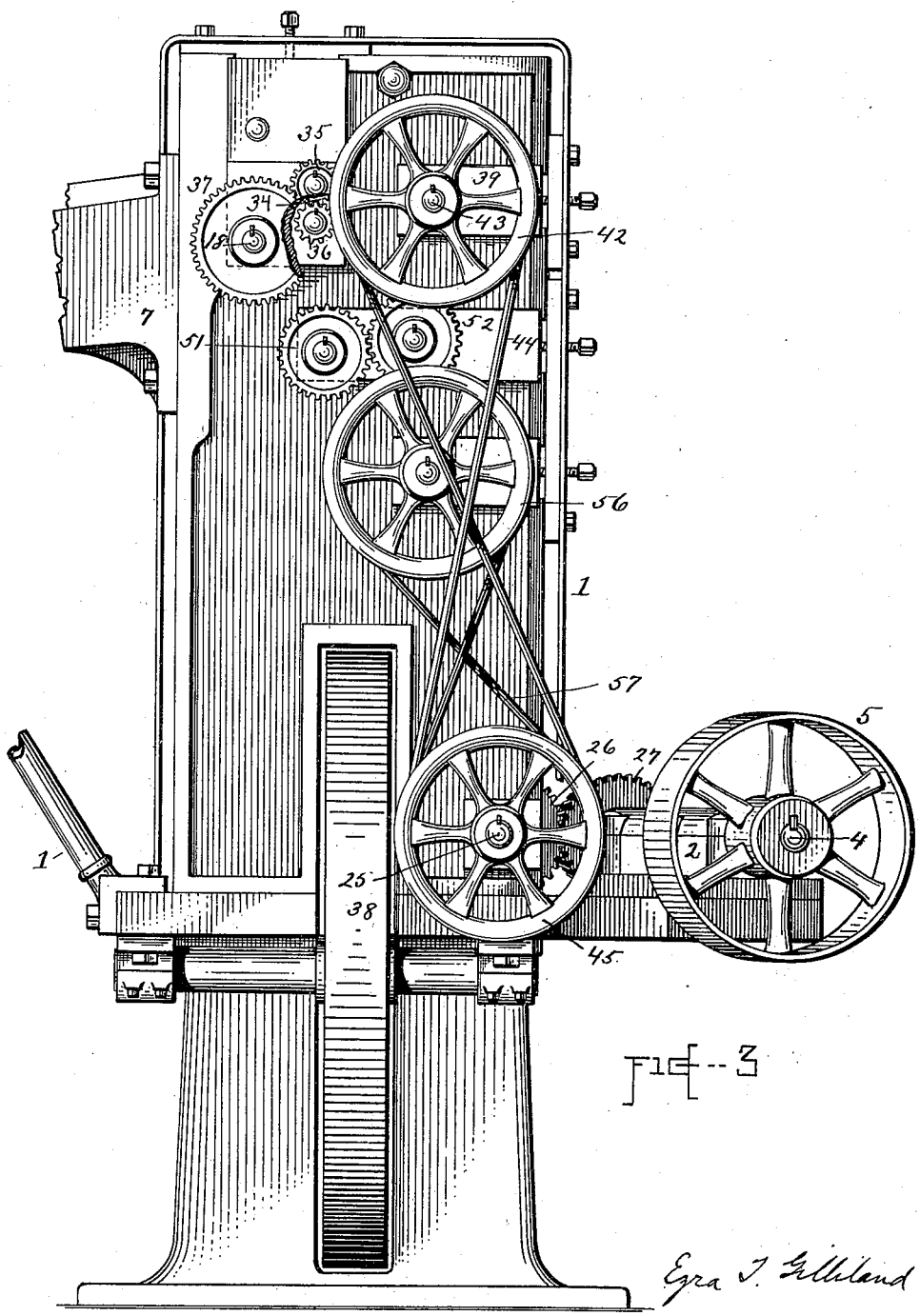

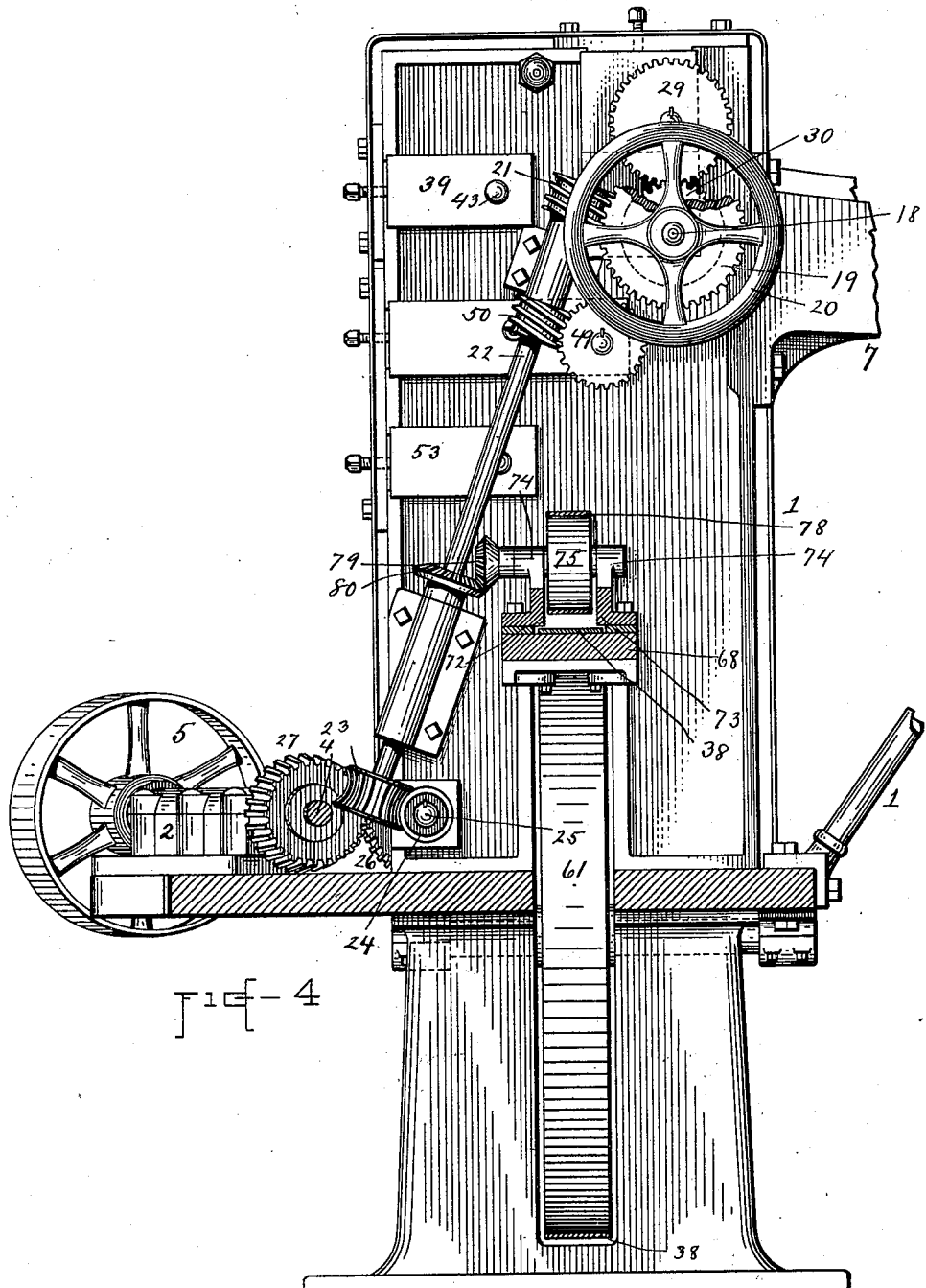

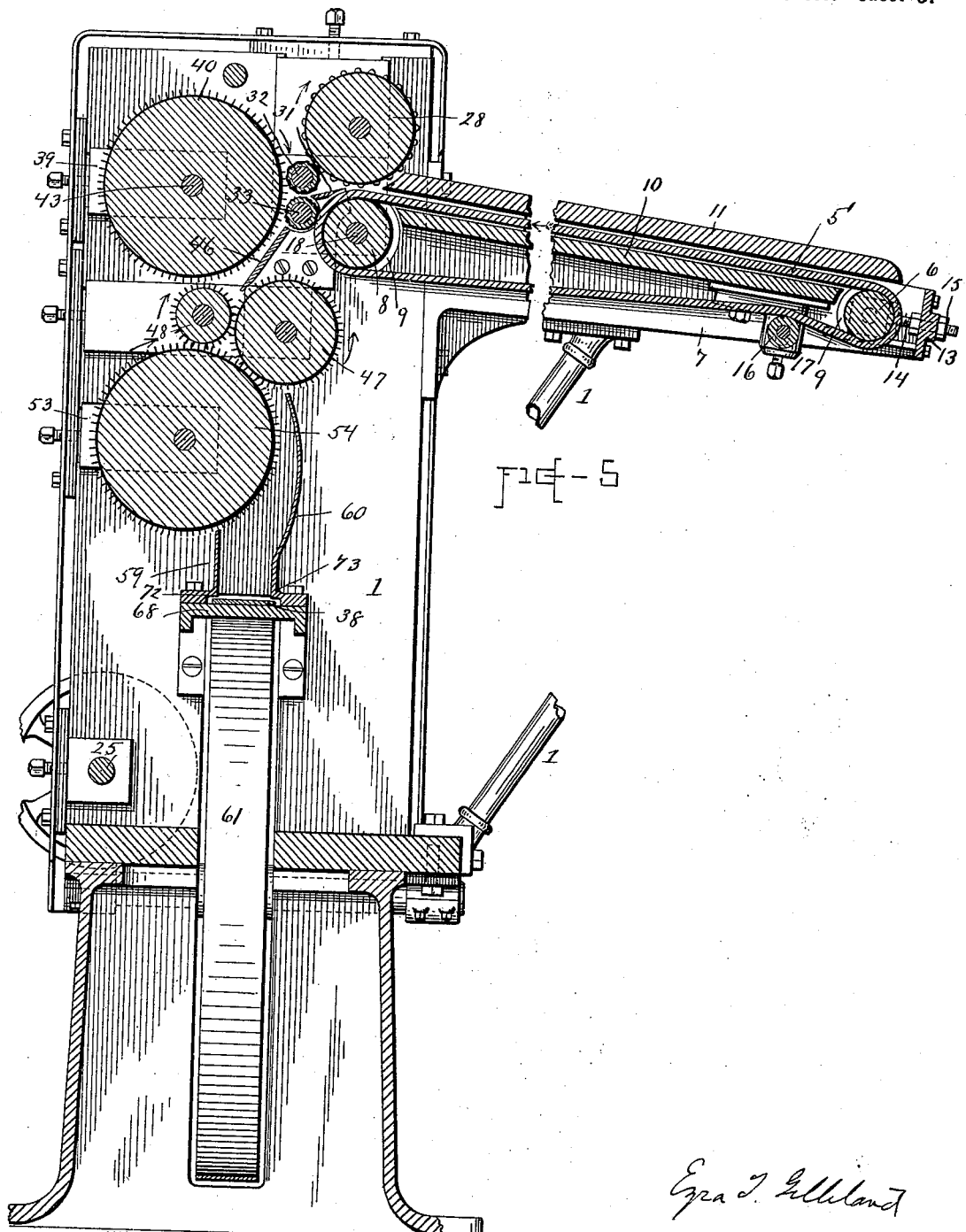

No. 639,677. Patented Dec. 19, 1899.
E. T. GILLILAND.
MACHINE FOR MAKING CIGARETTES.
(Application filed Feb. 1, 1898.)
(No Model.) 22 Sheets—Sheet 6.
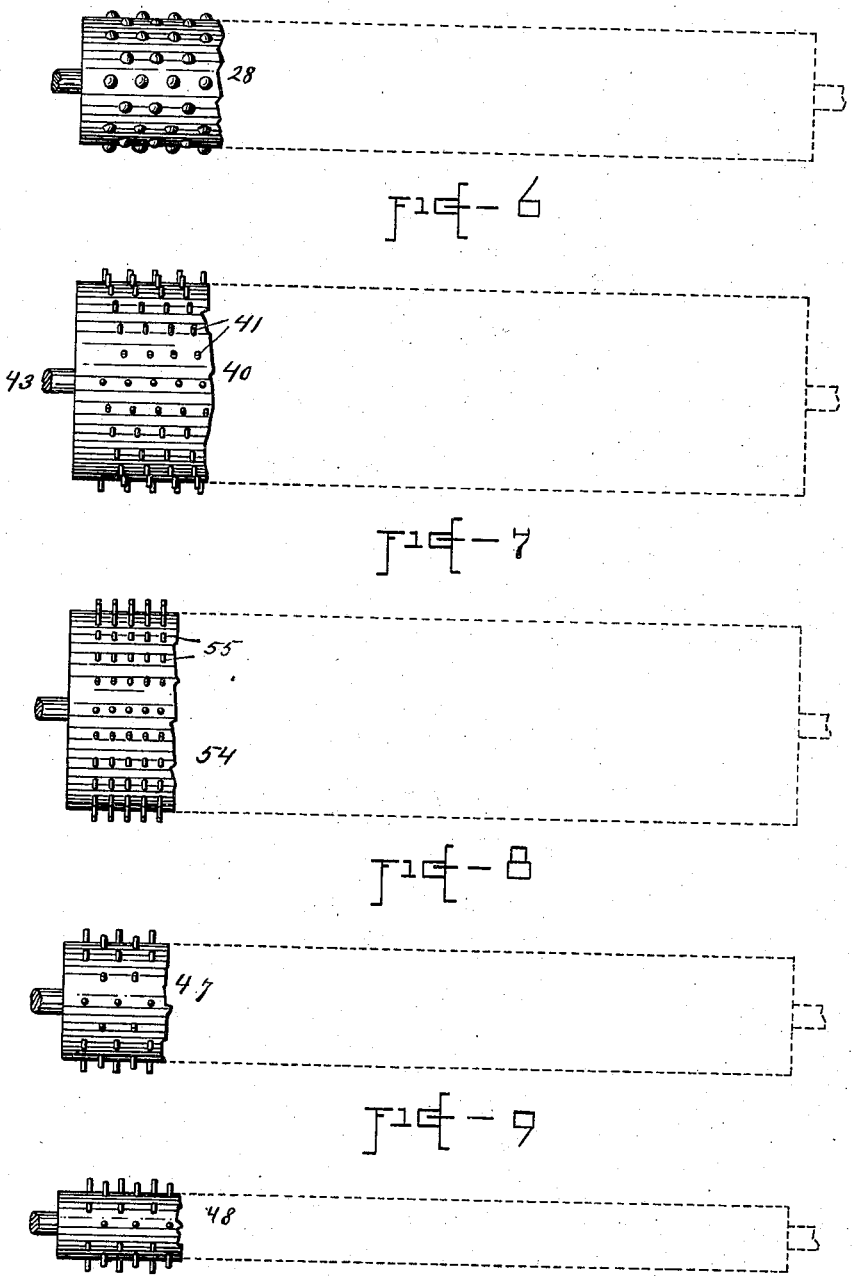
WITNESSES:
INVENTOR
ATTORNEY.

No. 639,677. Patented Dec. 19, 1899.
E. T. GILLILAND.
MACHINE FOR MAKING CIGARETTES.
(Application filed Feb. 1, 1898.)
(No Model.) 22 Sheets—Sheet 7.
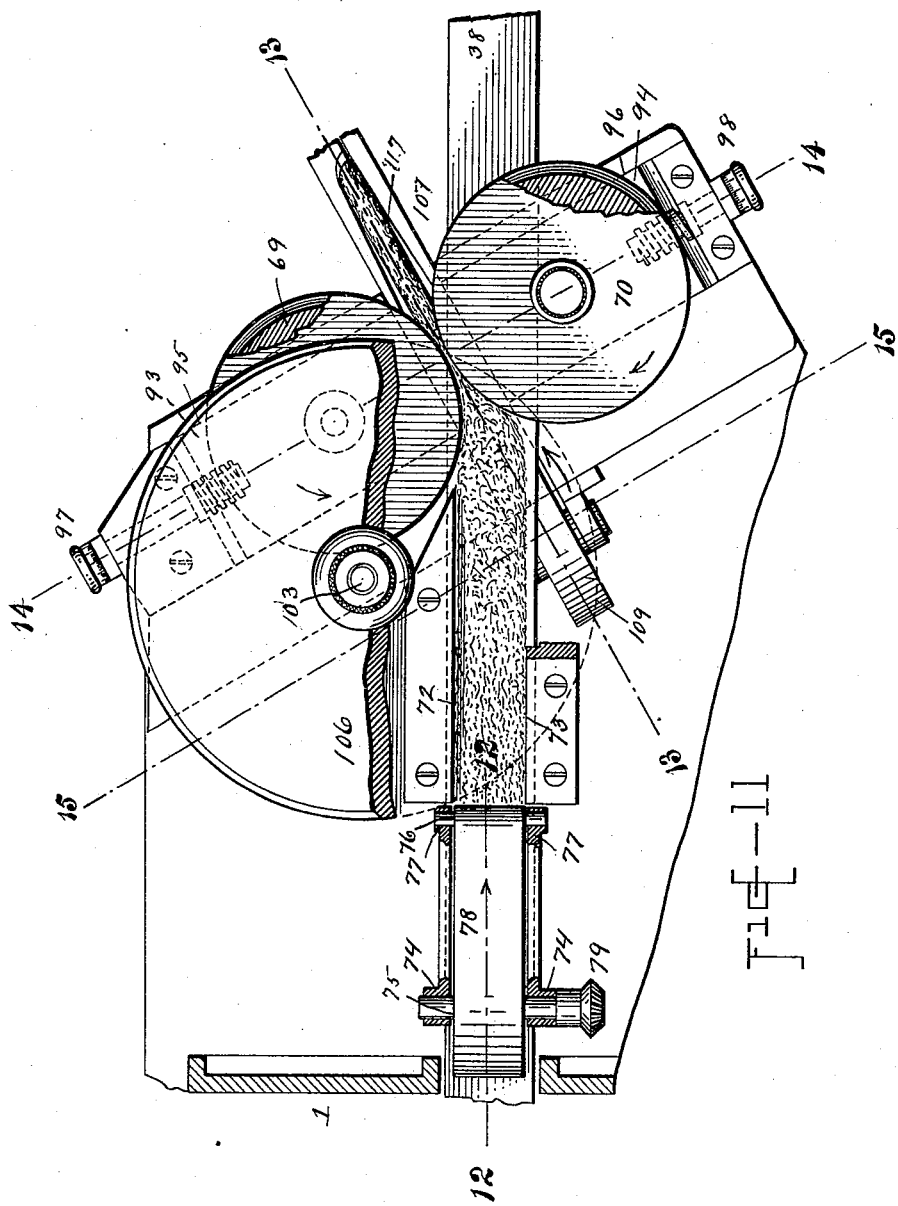

No. 639,677. Patented Dec. 19, 1899.
E. T. GILLILAND.
MACHINE FOR MAKING CIGARETTES.
(Application filed Feb. 1, 1898.)
(No Model.) 22 Sheets—Sheet 8.

WITNESSES:

INVENTOR
Ezra T. Gilliland

BY
ATTORNEY.

No. 639,677. Patented Dec. 19, 1899.
E. T. GILLILAND.
MACHINE FOR MAKING CIGARETTES.
(Application filed Feb. 1, 1898.)
(No Model.) 22 Sheets—Sheet 9.
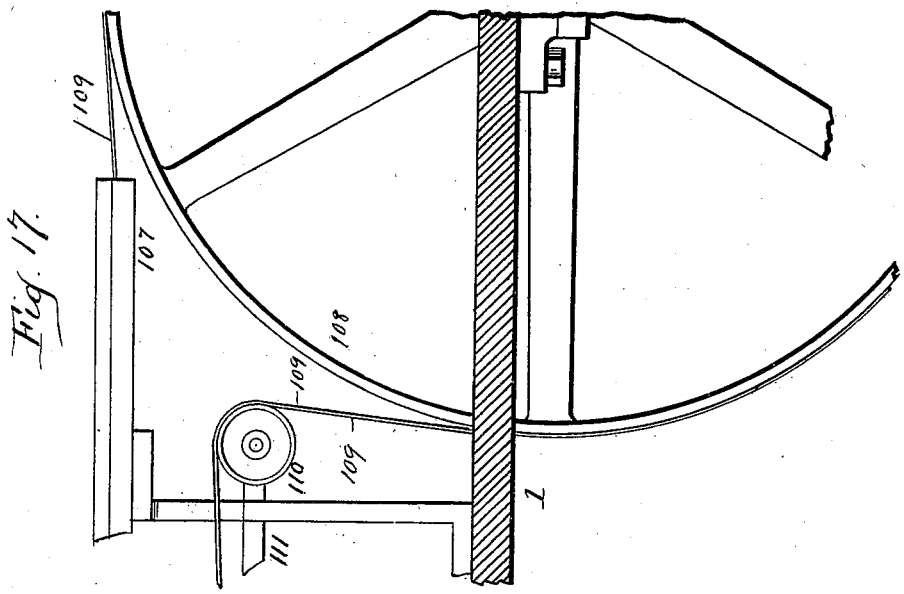
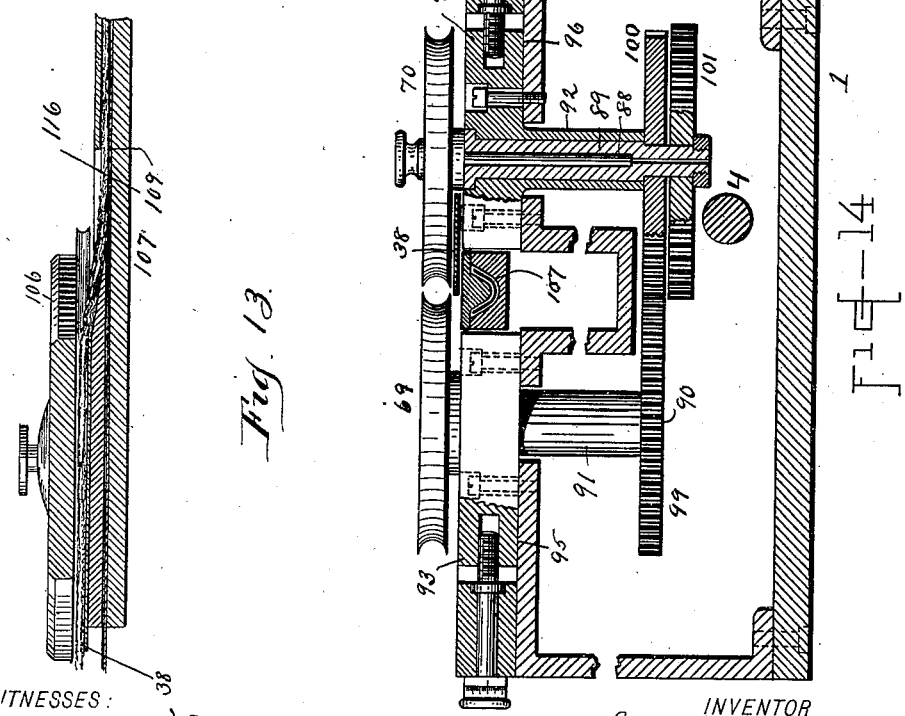
WITNESSES:
INVENTOR
Ezra T. Gilliland
BY
ATTORNEY.

No. 639,677. Patented Dec. 19, 1899.
E. T. GILLILAND.
MACHINE FOR MAKING CIGARETTES.
(Application filed Feb. 1, 1898.)
(No Model.) 22 Sheets—Sheet 10.

WITNESSES:

INVENTOR
Ezra T. Gilliland
BY
ATTORNEY.

No. 639,677. Patented Dec. 19, 1899.
E. T. GILLILAND.
MACHINE FOR MAKING CIGARETTES.
(Application filed Feb. 1, 1898.)
(No Model.) 22 Sheets—Sheet 11.
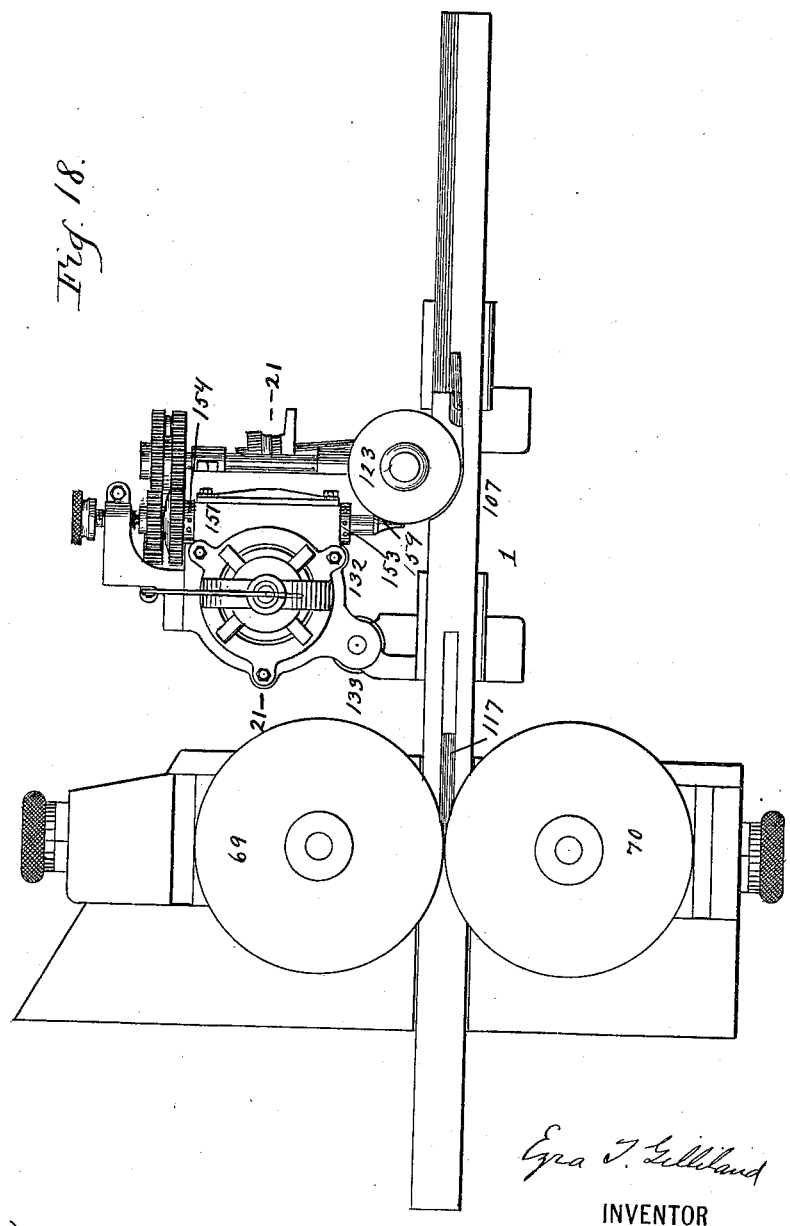
WITNESSES:
INVENTOR
BY
ATTORNEY

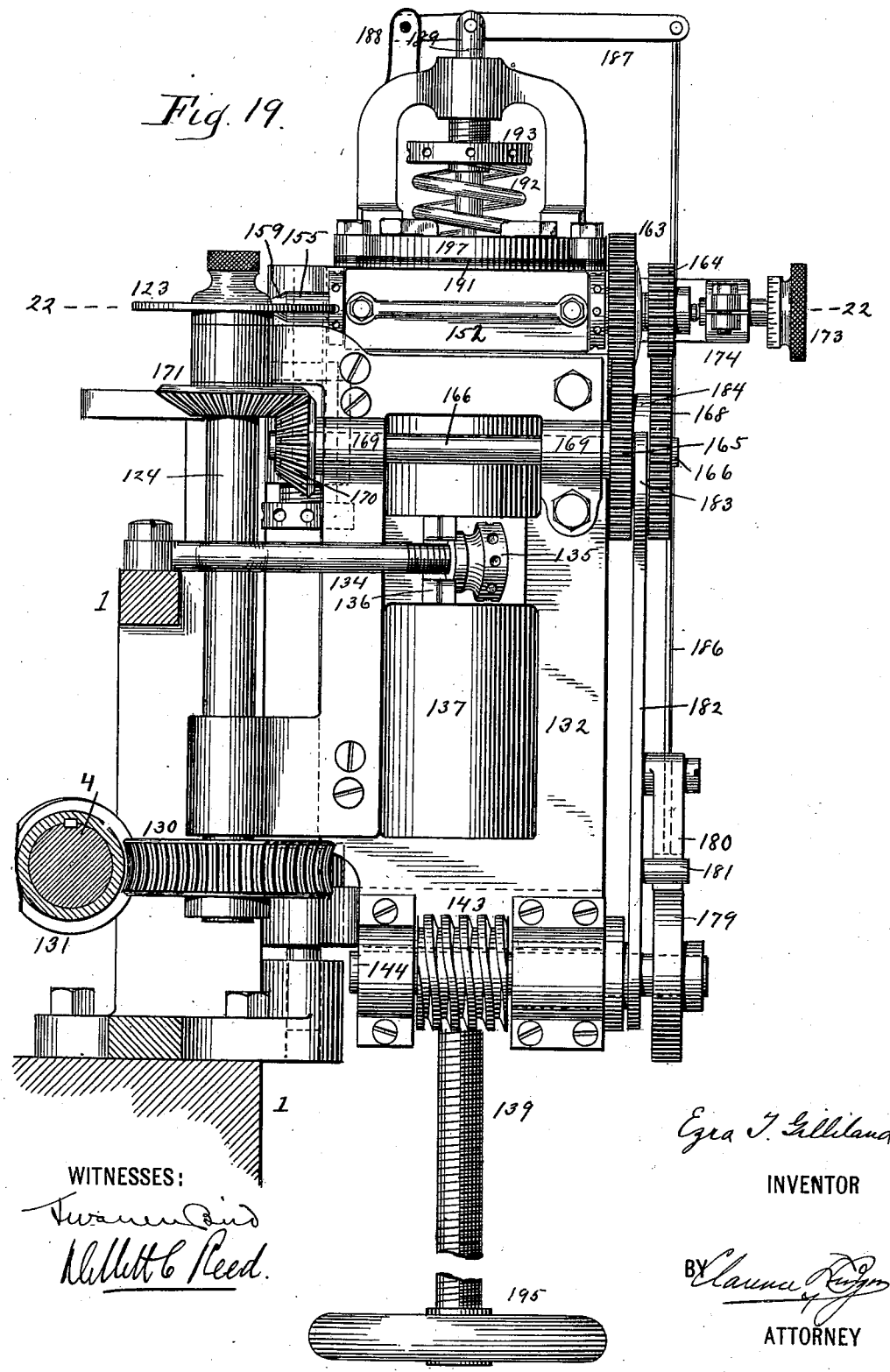

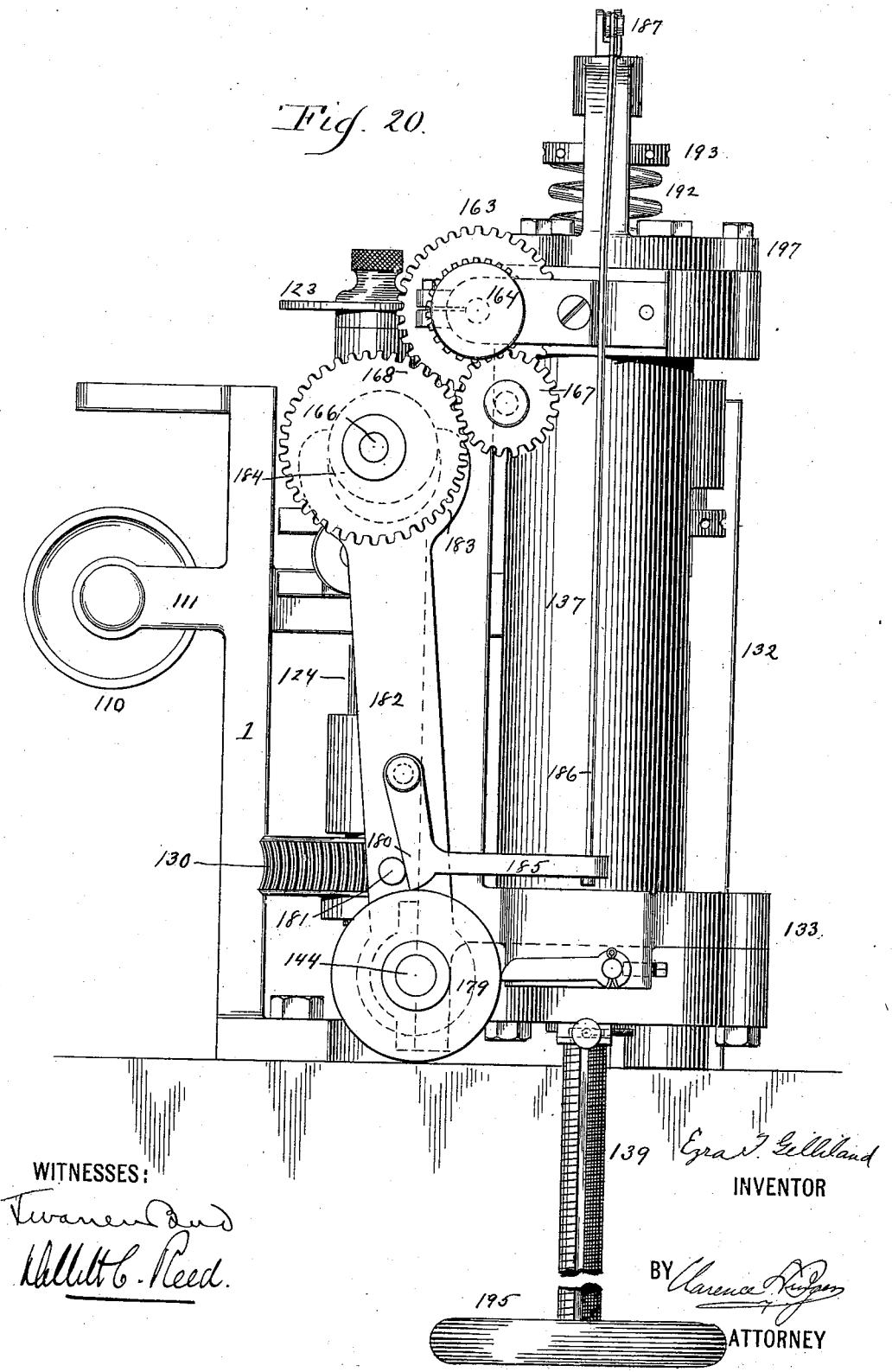

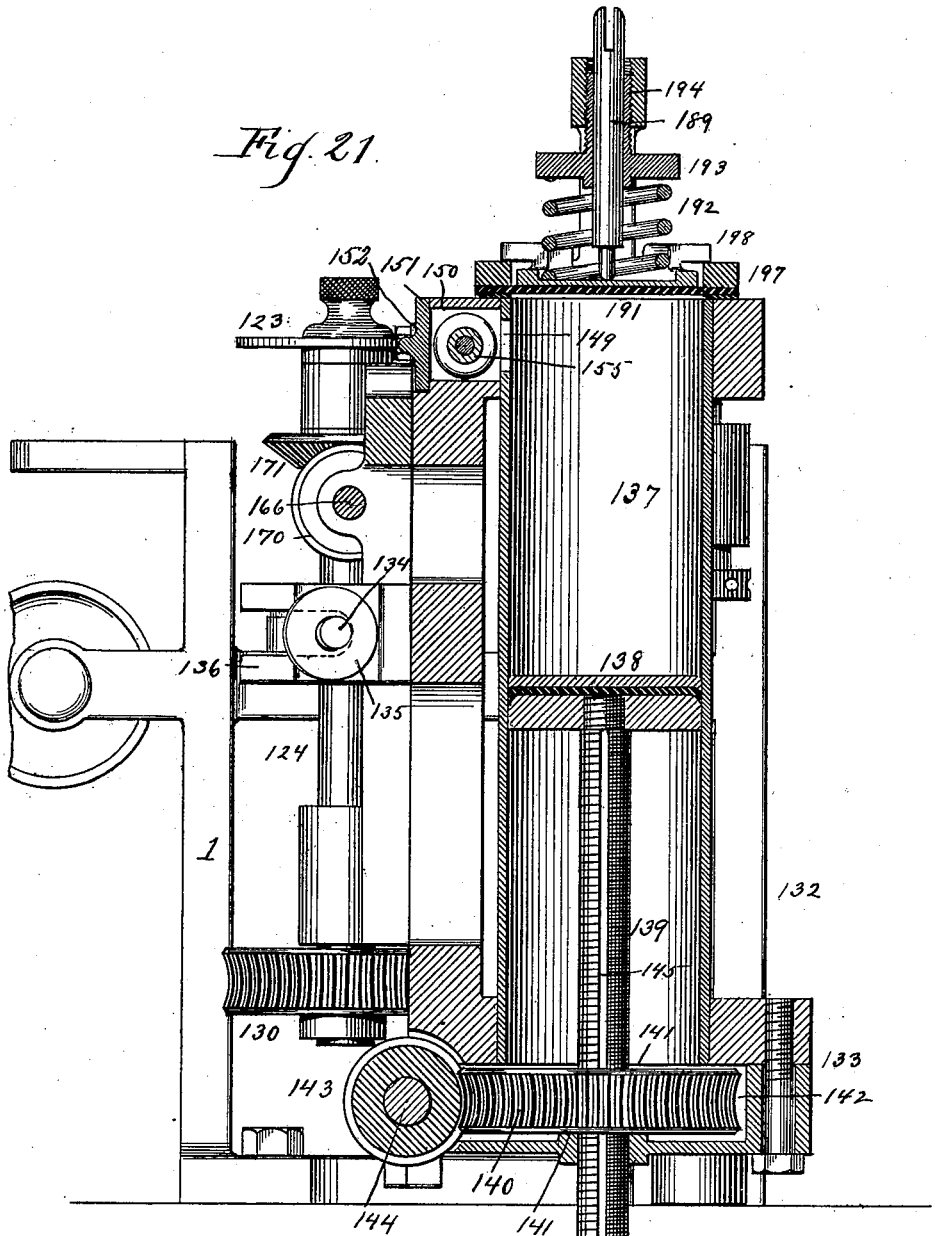

No. 639,677. Patented Dec. 19, 1899.
E. T. GILLILAND.
MACHINE FOR MAKING CIGARETTES.
(Application filed Feb. 1, 1898.)

(No Model.) 22 Sheets—Sheet 15.

WITNESSES:

INVENTOR
Ezra T. Gilliland

ATTORNEY

No. 639,677. Patented Dec. 19, 1899.
E. T. GILLILAND.
MACHINE FOR MAKING CIGARETTES.
(Application filed Feb. 1, 1898.)
(No Model.)
22 Sheets—Sheet 16.

WITNESSES:

INVENTOR
Ezra T. Gilliland.

ATTORNEY

No. 639,677. Patented Dec. 19, 1899.
E. T. GILLILAND.
MACHINE FOR MAKING CIGARETTES.
(Application filed Feb. 1, 1898.)
(No Model.) 22 Sheets—Sheet 17.
Fig. 25.
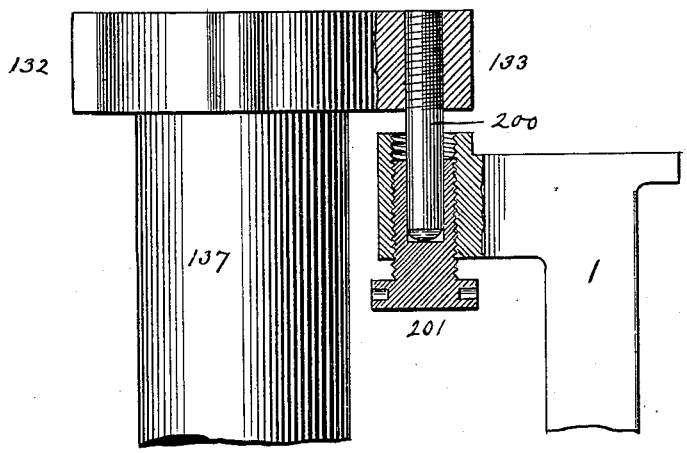
Fig. 26.
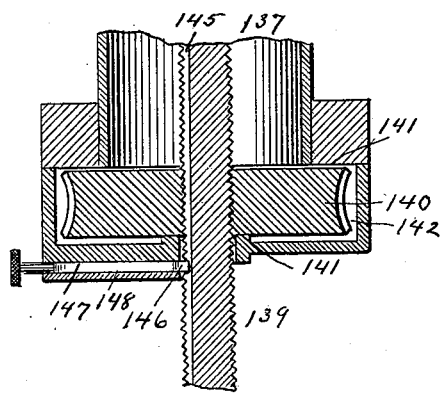
WITNESSES:
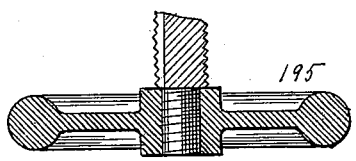
INVENTOR
ATTORNEY No. 639,677. Patented Dec. 19, 1899.
E. T. GILLILAND.
MACHINE FOR MAKING CIGARETTES.
(Application filed Feb. 1, 1898.)
(No Model.) 22 Sheets—Sheet 18.
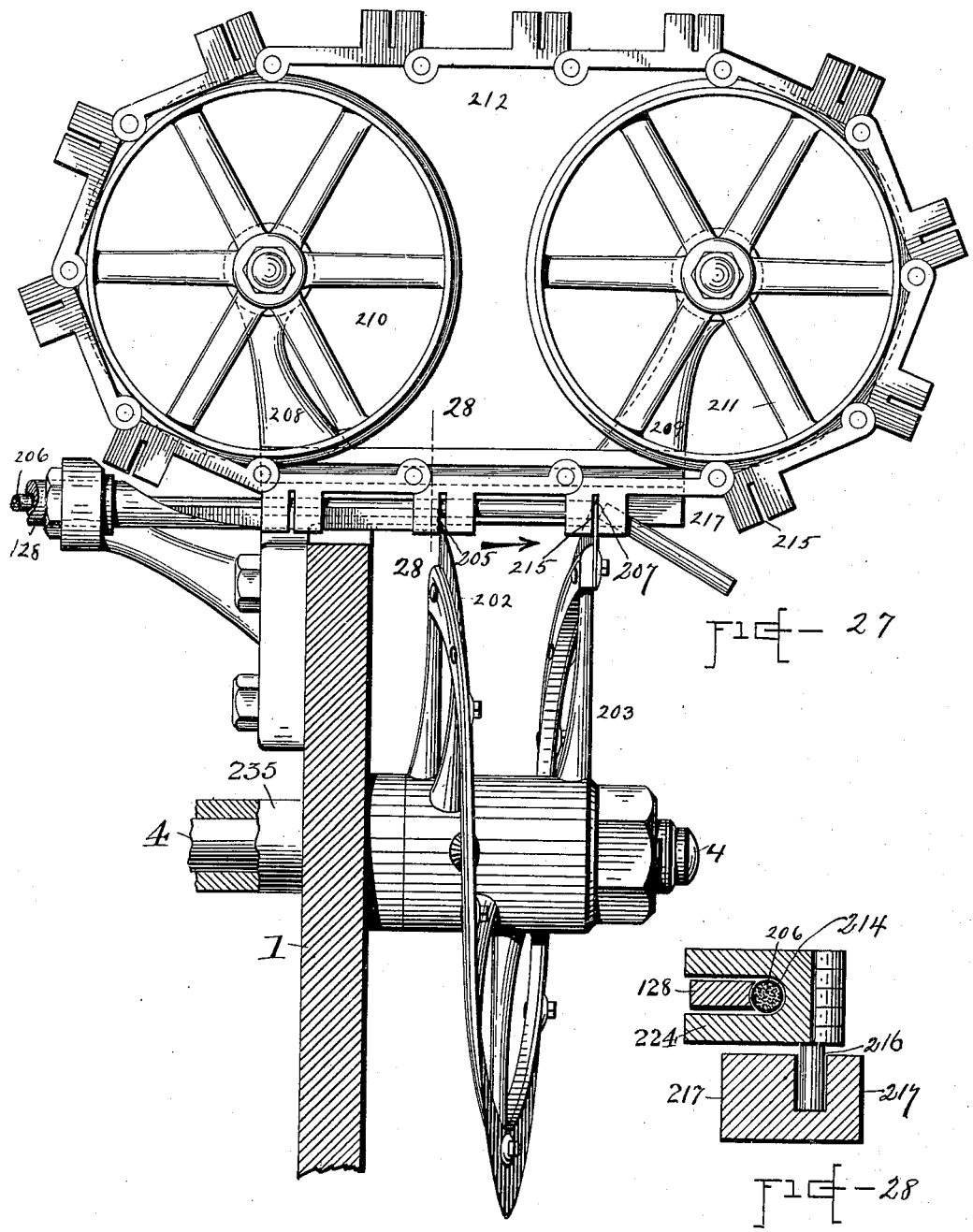
WITNESSES
INVENTOR
BY
ATTORNEY.
THE NORRIS PETERS CO., PHOTO-LITHO., WASHINGTON, D. C.

No. 639,677. Patented Dec. 19, 1899.
E. T. GILLILAND.
MACHINE FOR MAKING CIGARETTES.
(Application filed Feb. 1, 1898.)
(No Model.) 22 Sheets—Sheet 19.

WITNESSES:

Ezra T. Gilliland
INVENTOR

ATTORNEY.

No. 639,677. Patented Dec. 19, 1899.
E. T. GILLILAND.
MACHINE FOR MAKING CIGARETTES.
(Application filed Feb. 1, 1898.)
(No Model.) 22 Sheets—Sheet 20.
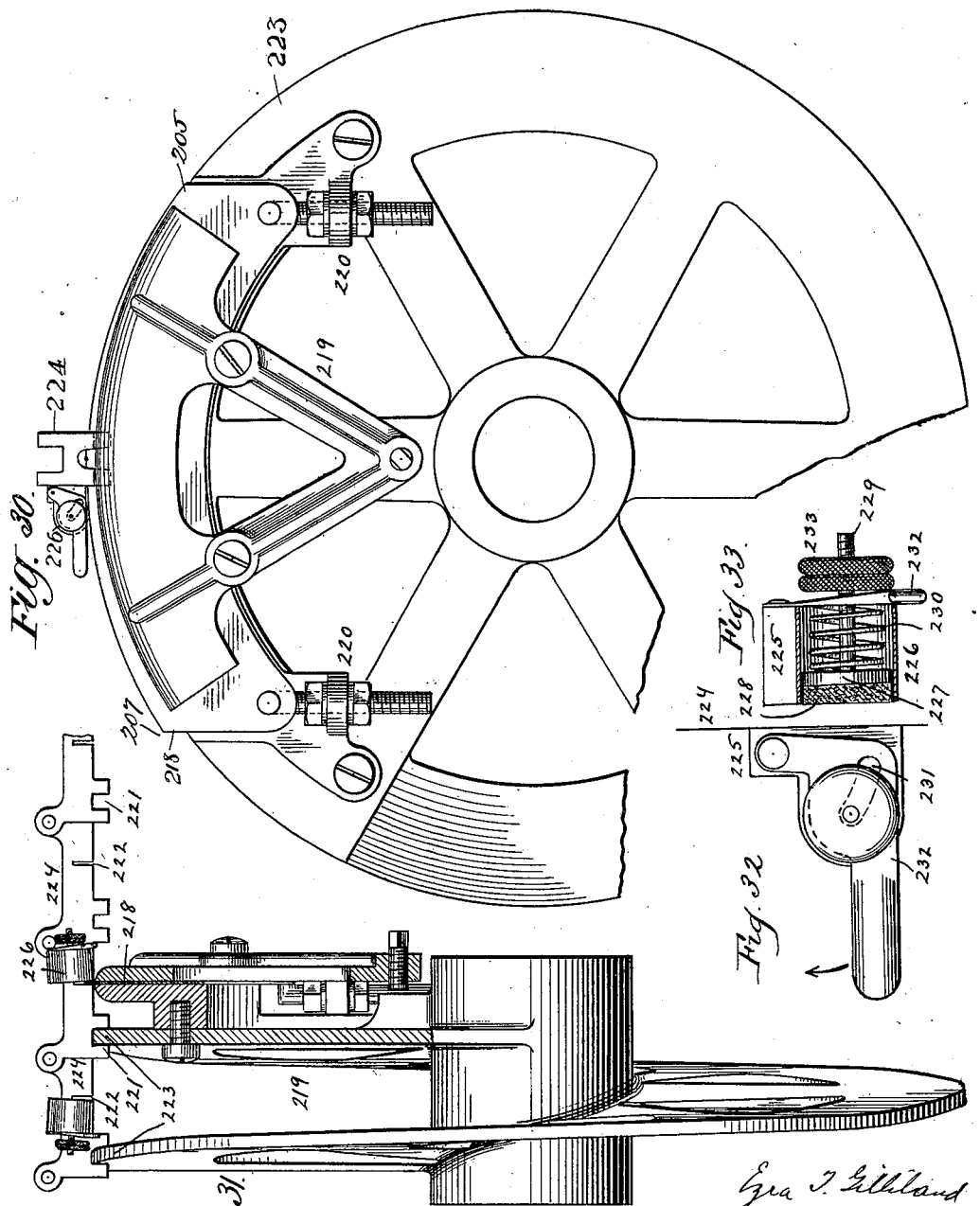
WITNESSES:
INVENTOR
ATTORNEY No. 639,677. Patented Dec. 19, 1899.
E. T. GILLILAND.
MACHINE FOR MAKING CIGARETTES.
(Application filed Feb. 1, 1898.)
(No Model.) 22 Sheets—Sheet 21.
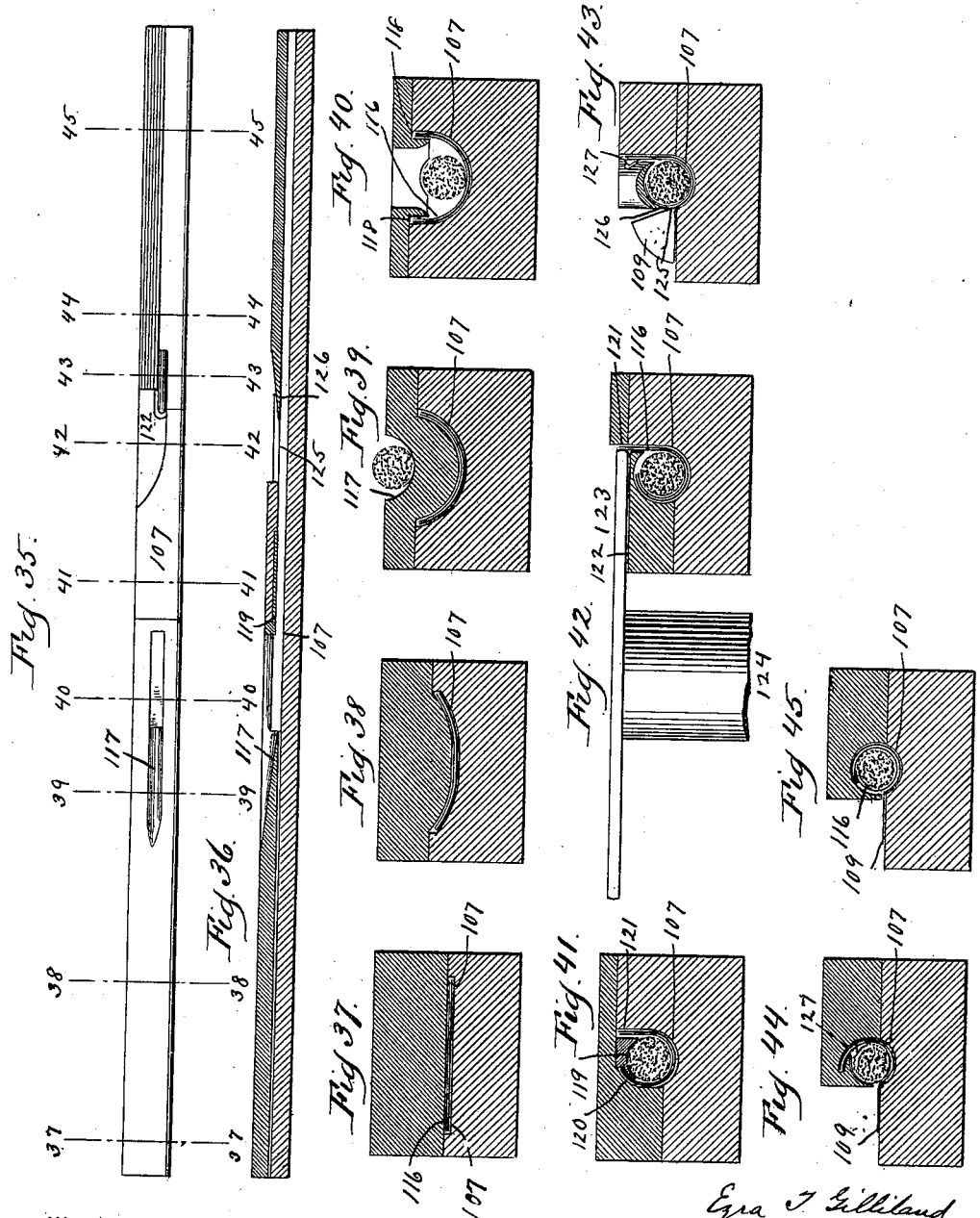

No. 639,677. Patented Dec. 19, 1899.
E. T. GILLILAND.
MACHINE FOR MAKING CIGARETTES.
(Application filed Feb. 1, 1898.)
(No Model.) 22 Sheets—Sheet 22.
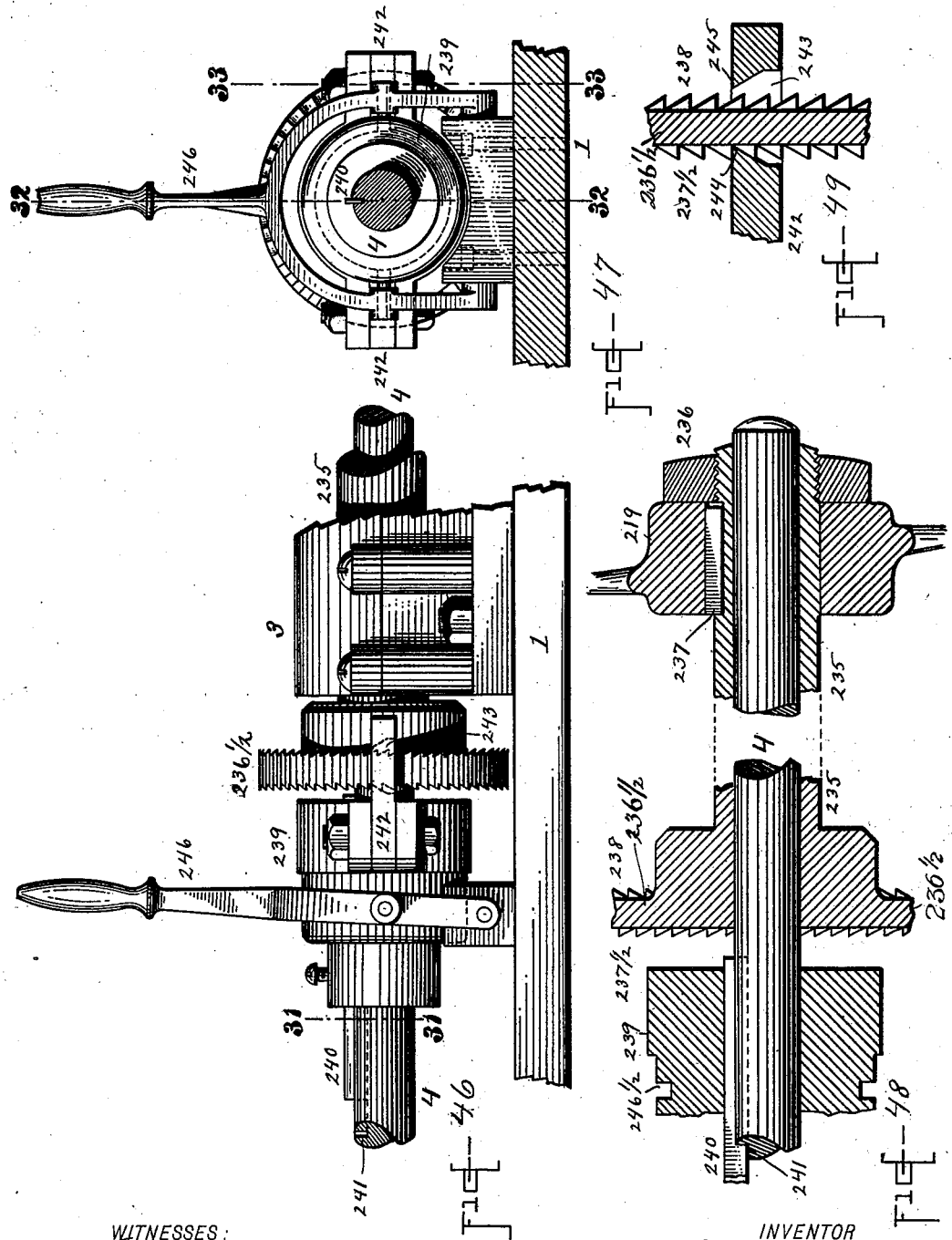
WITNESSES:
INVENTOR

United States Patent Office.

EZRA TORRENCE GILLILAND, OF NEW YORK, N. Y., ASSIGNOR TO CHARLES P. BUCHANAN AND RODERICK ROBERTSON, OF SAME PLACE.

MACHINE FOR MAKING CIGARETTES.

SPECIFICATION forming part of Letters Patent No. 639,677, dated December 19, 1899.

Application filed February 1, 1898. Serial No. 668,719. (No model.)

*To all whom it may concern:*

Be it known that I, EZRA TORRENCE GILLILAND, a citizen of the United States, residing in New York, (Pelham Manor,) in the county of Westchester and State of New York, have invented a new and useful Improvement in Machines for Making Cigarettes; and I do hereby declare that the following is a full, clear, and exact description of the same.

My invention relates to that class of cigarette-machines in the operation of which a continuous rod of tobacco or filler is formed from a stream of the same, around which rod is wrapped and secured a continuous wrapper-strip, forming a continuous cigarette, which is cut up into equal sections forming the individual cigarettes.

Among the principal objects of my invention are to simplify and improve the means for supplying the continuous stream of filler to the carrier; to improve the means for forming the stream of filler into the continuous rod; to improve the means for transferring the formed filler or rod to the wrapping-strip and tape, so that the rod will not lose its form in the interval; to improve the filler-rod wrapping and pasting mechanisms, and to provide better means for severing the continuous cigarette into individual cigarettes.

By my invention as a whole I have obtained a continuous cigarette-machine which has been found to be simple, strong, and durable and to produce cigarettes with great rapidity and of uniform quality.

In order that my invention may be fully understood, I shall first describe in detail the mode in which I have reduced my invention to practice and then point out its various novel features in the claims.

I shall refer by numbers to the accompanying drawings, forming part of this specification, using like numbers to indicate corresponding parts in the various figures.

Figure 15:
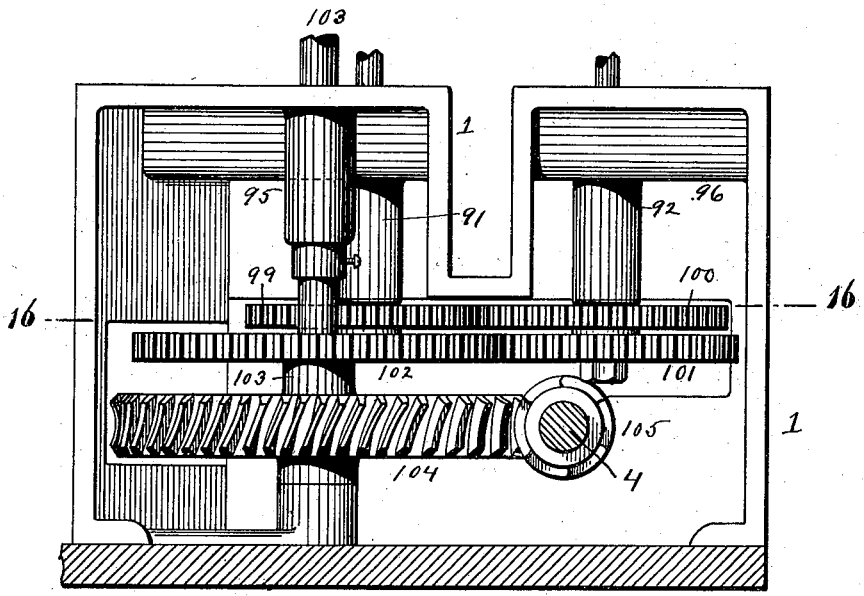
Figure 16:
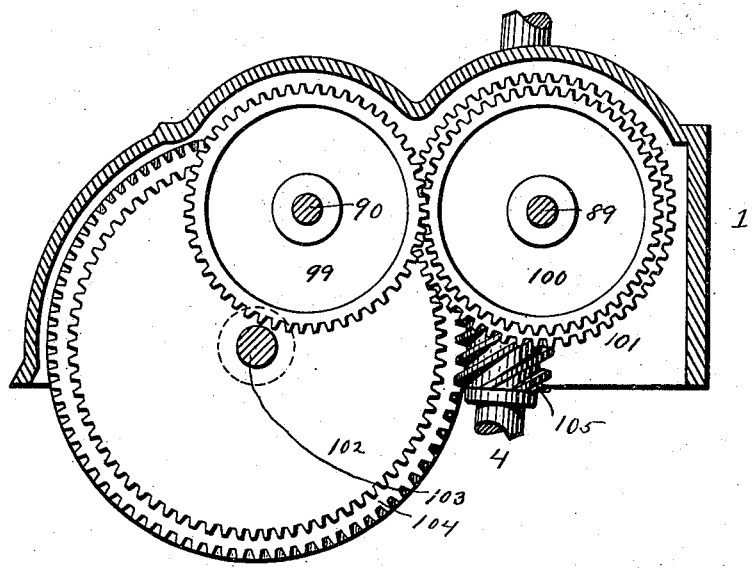
Figure 22:
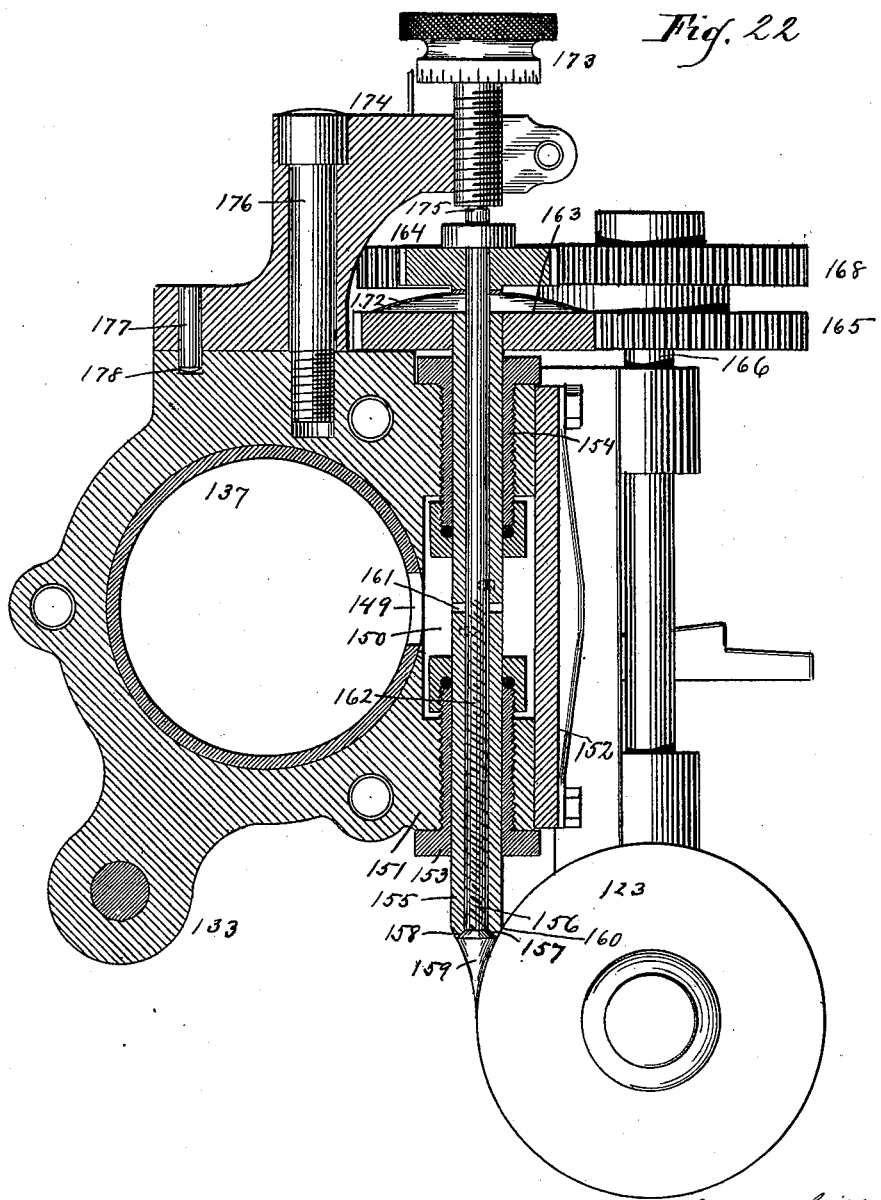
Figures 23, 24:
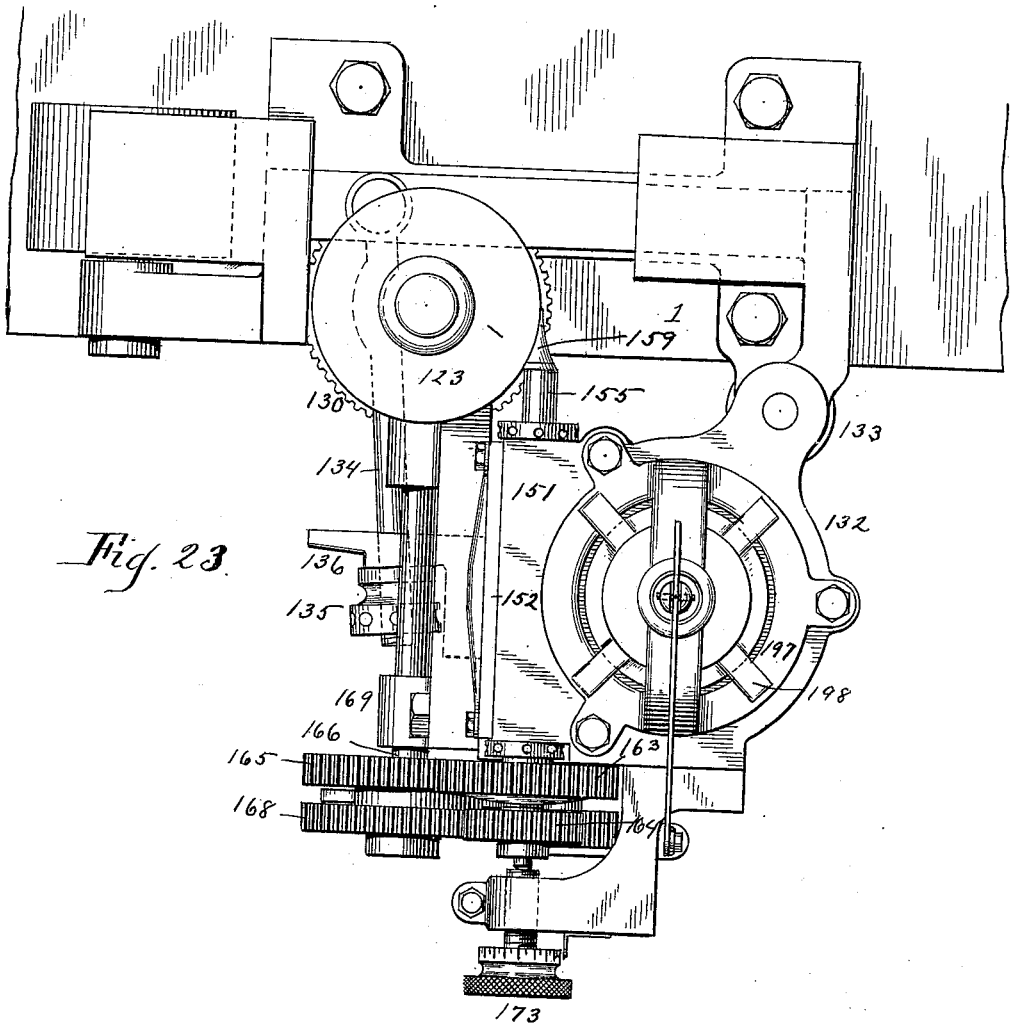
Figure 29:
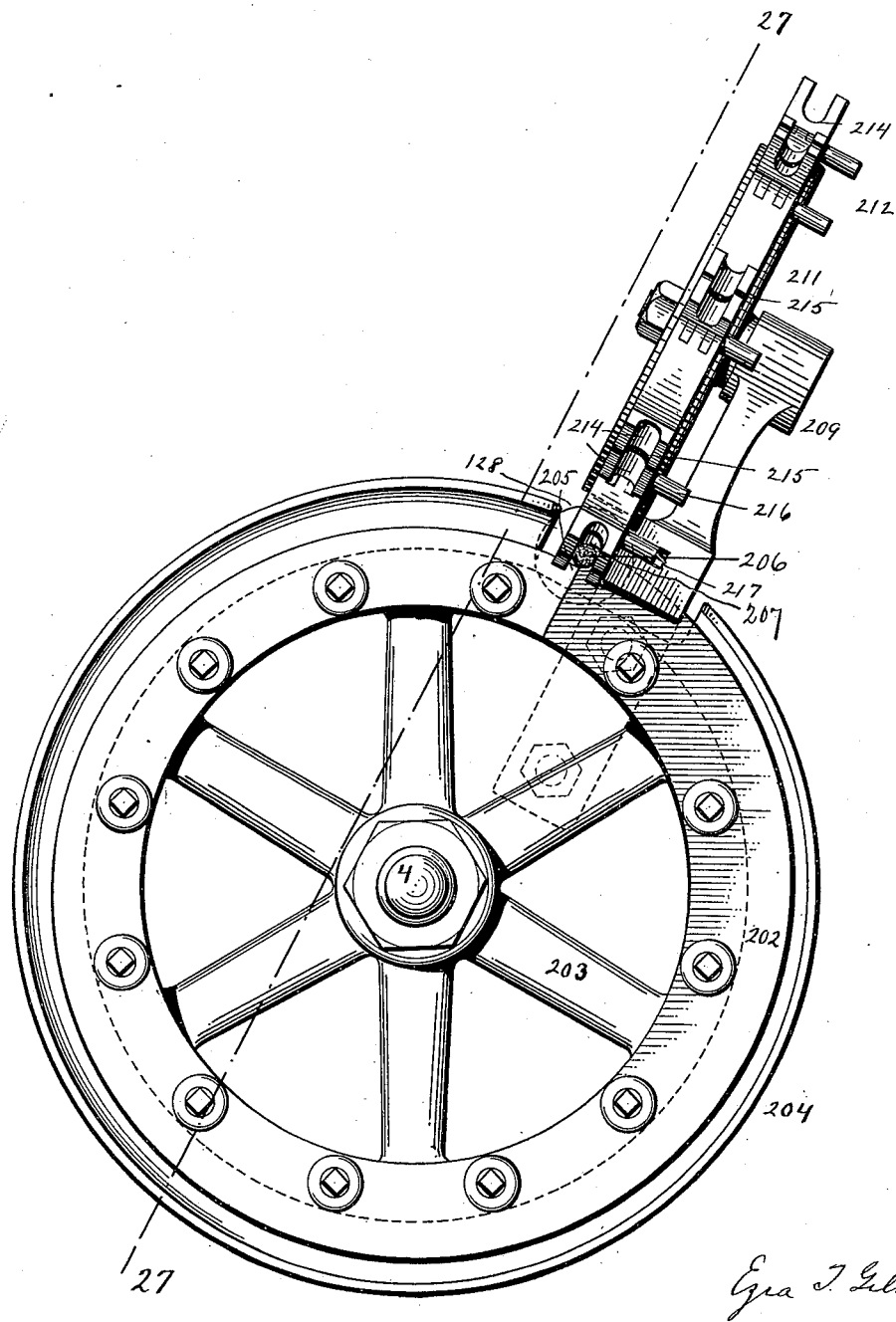

Figure 1 is a side elevation of the cigarette-machine in which I have reduced my invention to practice. Fig. 2 is a plan view of the same. Fig. 3 is an end elevation of the same, parts being omitted. Fig. 4 is a cross-sectional elevation of the same on the line 4 4, Fig. 2. Fig. 5 is a cross-sectional elevation of the same on the line 5 5, Fig. 2. Figs. 6, 7, 8, 9, and 10 are detail views showing the construction of various rolls employed in the mechanism for feeding the loose filler in a stream upon the endless carrier. Fig. 11 is a sectional plan view of the mechanism for forming the stream of filler upon the carrier into a continuous stick or rod, parts being shown broken away. Fig. 12 is a detail sectional elevation of said mechanism on the line 12 12, Fig. 11. Fig. 13 is a detail sectional elevation on the line 13 13, Fig. 11. Fig. 14 is a cross-sectional elevation on the line 14 14, Fig. 11. Fig. 15 is a detail cross-sectional elevation on the line 15 15, Fig. 11. Fig. 16 is a detail sectional plan view on the line 16 16, Fig. 15. Fig. 17 is a sectional side elevation showing part of the tape-driving pulley and its associated parts. Fig. 18 is a plan view of the rod-forming, wrapping, and wrapper-pasting mechanism. Fig. 19 is an enlarged side elevation of the paste-applying mechanism. Fig. 20 is a side elevation of the paste-applying mechanism, the view being taken from a direction at right angles to that of Fig. 19. Fig. 21 is a sectional elevation of the paste-applying mechanism on the line 21 21, Fig. 18. Fig. 22 is a sectional plan view of the paste-applying mechanism on the line 22, Fig. 19. Fig. 23 is a plan view of the paste-applying mechanism. Fig. 24 is a grossly-enlarged detail view illustrating the coöperation of the pasting-wheel and its paste-applying cone. Figs. 25 and 26 are detail views of parts of the paste-applying mechanism hereinafter fully described. Fig. 27 is an enlarged sectional side elevation of the mechanism for cutting the continuous cigarette into individual cigarettes on the line 27 27, Fig. 29. Fig. 28 is a detail sectional view on the line 28 28, Fig. 27. Fig. 29 is a cross-sectional elevation of the same. Fig. 30 illustrates the form of cutter and cutter-sharpener which I generally prefer to use. Fig. 31 is another view of said cutter and sharpener, partly in section. Figs. 32 and 33 are enlarged detail views of said cutter-sharpener. Fig. 34 is a detail sectional view of the means for adjusting the blade of said cutter. Fig. 35 is a plan view of the wrapper folding and pasting trough. Fig. 36 is a longitudinal sectional elevation of the same. Figs. 37, 38, 39, 40, 41, 42, 43, 44, and 45 are cross-sectional views taken on the lines 37 37, 38 38, 39 39, 40 40, 41 41, 42 42, 43 43, 44 44, 45 45, respectively, of Fig. 35, showing the filler-rod, the wrapper-strip, and the wrapping-tape in various steps of the wrapping and pasting operations. Figs. 46, 47, 48, and 49 are enlarged detail views of the cutter-adjusting mechanism.

In the drawings, 1 denotes the frame of the machine, in bearings 2 3 of which I have mounted a main driving-shaft 4, carrying a belt-pulley 5, by which the shaft itself is driven.

To receive the supply of loose filler and carry it to the distributing-rolls hereinafter described any suitable means may be employed. I prefer, however, to employ the means shown in the drawings, particularly in Figs. 1 and 5, and described as follows: An endless-belt apron 5', of vulcanized fabric or similar material, is arranged at a slight inclination from the horizontal plane to run from and around a roll 6, journaled in the outer end of a bracket-like extension 7 of the frame 1 to and around a roll 8, journaled in the upper part of the frame 1, said rolls 6 and 8 having end flanges 9 on opposite sides of the belt-apron 5' to prevent the same from shifting laterally on the rolls. Between the rolls 6 and 8 the upper part of the belt-apron 5' runs over and is supported by a bed-plate 10, fixed on the bracket-like extension 7, and above and along the sides of the belt-apron are fixed marginal strips 11 to guide therebetween the supply of loose tobacco or filler, which is spread by the operator in a layer of uniform density and thickness upon the belt 5' as the same travels toward the roll 8. The bearings 12 of the outer belt-apron roll 6 are mounted adjustably in the bracket-like extension 7 and are connected with the end member 13 thereof by tension-screws 14 and nuts 15, so that by turning the nuts 15 the belt-apron can be tightened or slackened, as may be required, to place it under tension. The lower part of the belt-apron, near the roll 6, runs over and is supported by a loose roll 16, journaled adjustably in bearings 17, fixed to the bracket-like extension 7, so that by properly adjusting said roll 16 the tension of the belt-apron can be further regulated as desired. The belt-apron 5' is caused to travel by means of its inner roll 8, on one end of the shaft 18 of which is mounted loosely a worm-wheel 19, which can be locked to and unlocked from said shaft 18 by means of a clutch 20. The worm-wheel 19 gears with a worm 21, fixed on an inclined shaft 22, which is journaled to the frame 1 and has at its lower end a worm-wheel 23, gearing with a worm 24 on a shaft 25, having a bevel gear-wheel 26, gearing with a bevel gear-wheel 27 on the main driving-shaft 4, so that by this gearing the belt-apron 5' is operated by the main driving-shaft 4 and can be stopped without stopping the shaft 4 by unlocking the clutch 20.

Over the inner roll 8 and end of the belt-apron 5' is mounted adjustably in the frame 1 a transverse roll 28, (shown in detail in Fig. 6,) having its surface studded with hemispherical projections and driven, by means of the spur-gears 29 and 30, connecting its shaft with the roll 8, in the opposite direction to the motion of the belt-apron 5', so as to compress and grip without tearing the loose filler on the moving belt-apron 5' and cause it to be fed forward positively thereby over the short inclined bridge 31 to and between small superposed compression-rolls 32 and 33. The rolls 32 and 33 are journaled in the frame 1 and are preferably fluted longitudinally, so as to firmly grip and feed forward the filler, and they are driven by means of pinions 34, 35, and 36, gearing with a spur-wheel 37 on the shaft 18.

To take the filler issuing from the described feeding-rolls and deposit or distribute it in a uniform continuous stream (as represented in Fig. 11) upon the belt-carrier 38, any suitable means may be used; but I employ by preference the mechanism shown in the drawings and described as follows:

Closely to and in front of the small feeding-rolls 32 and 33 is journaled in bearings 39, adjustable toward and from the rolls 32 and 33, a picker-roll 40, (shown in detail in Fig. 7,) having its surface studded with pins or teeth 41, arranged spirally around the roll from end to end. This picker-roll 40 is driven (in the direction indicated by the arrow in Fig. 5) by means of a belt-wheel 42 on its shaft 43, connected by a crossed belt 44 with a belt-wheel 45 on the before-mentioned shaft 25 and, owing to its peculiarly-arranged pins or teeth 41, carries the filler emerging from the rolls 32 and 33 downward and at the same time separates and distributes it laterally and longitudinally. Aided by an inclined bridge 46 the filler thus distributed is carried by said picker-roll 40 to and between further distributing or evening rolls 47 and 48, the teeth of each of which run between the teeth of the other and are shown in detail in Figs. 9 and 10, respectively. The distributing-rolls 47 and 48 are driven (in the directions indicated by their arrows in Fig. 5) by means of a worm-wheel 49 on the shaft of the larger roll 47, gearing with a worm 50 on the before-mentioned shaft 22, and spur-wheels 51 and 52, connecting the opposite end of said roll 47 with the roll 48, the arrangement being such that the teeth of the larger roll 47 will travel at a higher (peripheral) speed than the interrunning teeth of the roll 48, and thus more effectually separate even and distribute the filler between the rolls. Below the distributing-rolls 47 and 48 is journaled in adjustable bearings 53 a stripping-roll 54, (shown in detail in Fig. 8,) whose surface is studded with pins or teeth 55, which run, in the direction indicated by the arrow in Fig. 5, between the teeth of both the distributing-rolls 47 and 48 and carry the filler downward therefrom in a uniform and constant stream. The stripping-roll 54 is driven by means of a belt-wheel 56 on its shaft, connected by a crossed belt 57 with a belt-wheel 58 on the before-mentioned driven shaft 25, and the stream of filler falls from said stripping-roll between closely-approximating confining-walls 59 and 60 upon the before-mentioned moving belt-carrier 38 in a stream of uniform density and dimensions.

The belt-carrier 38 I employ is a highly-tempered flexible steel belt, which is extremely advantageous for the reason that it does not materially yield, stretch, or change its shape or character under varying conditions. It runs from and around a large belt-wheel 61, journaled in the frame 1 under the stripping-roll 54, to and around another belt-wheel 62, journaled in the frame 1, and is driven in the direction indicated by the arrow in Fig. 2 by means of a bevel gear-wheel 63, which is on the shaft of the belt-wheel 62, and engages a bevel gear-wheel 64 on a shaft 65, carrying a worm-wheel 66, which gears with a worm 67 on the main driving-shaft 4. To form the uniform stream of filler thus deposited upon the moving belt-carrier 38 into a continuous stick or rod, I employ the mechanism shown and hereinafter described, but other suitable mechanism may be employed instead thereof.

The upper part of the belt-carrier 38 runs over and is sustained between its belt-wheel 61 and the forming-wheels 69 and 70 by a longitudinal bed-plate 68, fixed on the main frame 1.

Along both sides of the belt-carrier 38 on the bed-plate 68 are fixed straight ledges 72 and 73, which project inwardly over the edges of the belt-carrier and confine the filler carried thereon laterally. Over the belt-carrier 38, where it issues laterally from between the before-mentioned confining-walls 59 and 60, is journaled in fixed bearings 74 a large belt-wheel 75, and further along and over the belt-carrier 38 is journaled in bearings 77 a smaller belt-wheel 76, whose periphery turns in closer proximity to the belt-carrier 38 than the periphery of the belt-wheel 75. Around the belt-wheels 75 and 76 is stretched a compressing-belt 78, whose lower strand runs with and over the belt-carrier 38, between the side confining-ledges 72 and 73, and converges in the vertical plane toward said belt-carrier, so as to carry the stream of filler forward with the belt-carrier and at the same time compress it and reduce its thickness, so as to pass beneath the diverting-disk 106 hereinafter described. The lower compressing-strand of compressing-belt 78 is driven in the direction indicated by the arrow in Fig. 11, and at the same progressive speed as the belt-carrier 38, by means of a bevel gear-wheel 79 on the shaft of the larger compressing-belt wheel 75, engaging with a bevel gear-wheel 80 on the before-described inclined driven shaft 22. To keep the compressing-belt 78 properly taut, a loose roll 81 is journaled over the upper strand of the belt in bearings of a frame 82, pivoted to swing vertically on a standard 83, and an adjusting-screw 84 is mounted in the standard 83 to bear on the adjustable frame 82, so that by properly adjusting said screw the belt 78 can be tightened to any degree desired. The lower compressing-strand of the belt 78 is supported against the upward pressure of the filler by an inclined plate 85, under and along which the belt 78 travels.

A very important and advantageous feature of my invention is the arrangement of the forming-wheels 69 and 70 with relation to the belt-carrier 38 and the wrapping devices, as perhaps best shown in Figs. 2, 11, 13, and 14. The forming-wheels 69 and 70, which are peripherally grooved in accordance with the desired cross-section of the cigarette—circular, elliptical or otherwise—are mounted tangentially to each other on the belt-carrier 38, so that their vertical axes will be in a plane inclined at an angle of about sixty degrees to the line of travel of the carrier-belt and their tangential point be on one edge of the belt-carrier 38. By this arrangement I am enabled to lead the filler from the forming-wheels 69 and 70 into the wrapping-trough 107 and wrapping-tape 109, which are on a line perpendicular to the plane of the axes of the forming-wheels with the shortest possible intervening opening or space, so that the formed and compressed filler will have little or no time to expand and lose its form before it is confined by the wrapping trough and tape.

The forming-wheels 69 and 70 are fixed by means of spindles 88 on the upper ends of vertical shafts 90 and 89, respectively, which are mounted to revolve in sleeves 91 and 92, carried by bearing-plates 93 and 94, and said bearing-plates are mounted to slide toward and from each other in guideways 95 and 96 in the frame 1 and are threaded to receive adjusting-screws 97 and 98, by which, therefore, the forming-wheels may be accurately adjusted toward and from each other for regulating the formation and compression of the filler thereby. The forming-wheels 69 and 70 are rotated at the same speed and in the directions indicated by the arrows in Fig. 11 by means of geared spur-wheels 99 and 100 on their shafts 90 and 89, and a spur-wheel 101 on the shaft 89 gearing with a spur-wheel 102 on a shaft 103, which has a worm-wheel 104 gearing with a worm 105 on the before-described main driving-shaft 4. On the upper end of the said vertical shaft 103, through the medium of which the forming-wheels are driven, I fix detachably a flat diverting-disk 106, which closely covers the trough formed by the side ledges 72 and 73 and the bed-plate 68, in which the filler-carrier 38 runs from the end of the compressing-belt 78 to the tangential or nearly-meeting point of the forming-wheels 69 and 70, and thus the disk 106 lies over and closely approaches part of said forming-wheels, as best shown in Fig. 11.

The shaft of the diverting-disk 106 being to one side of the belt-carrier 38 and equally distant from the end of the compressing-belt 78 and the tangential point of the forming-wheels 69 and 70 said diverting-disk represses or downwardly confines the filler previously compelled by the belt 78 to pass beneath it, and its peripheral portion at the point where the filler enters between the forming-wheels 69 and 70 turns substantially at the same lateral inclination to the belt-carrier as the line of passage between the forming-wheels, so as to materially aid in diverting the filler at that point to said inclined line of passage and in preventing a retardation or crowding of the filler at that point. The filler passing between the grooved forming-wheels 69 and 70 is thus compressed and formed into the desired cylindrical or elliptical shape, as the case may be. For wrapping the filler thus compressed and formed into the desired cross-section by the forming-wheels 69 and 70 and pasting or securing the wrapper I prefer to employ the mechanism shown in the drawings and described as follows, although any other means suitable for the purpose may be employed. On said laterally-inclined line of movement of the formed filler, which is at about an angle of thirty degrees to the direction of movement of the belt-carrier 38, and closely underlying said belt-carrier is fixed on the frame 1 a trough 107, (shown in detail in Figs. 35 to 45, inclusive,) extending from a point in the rear of the forming-wheels 69 and 70 to and between the bearing-plates 93 and 94 of the forming-wheels 69 and 70, as shown in Fig. 14, and thence to a point over a large tape-driving wheel 108. Through the trough 107 from end to end runs a wrapping-tape 109 like that usually employed in continuous-cigarette machines. Thence it runs over and around the said tape-driving wheel 108, thence rearwardly over a small guide-wheel 110, journaled in a fixed bearing 111, thence under and around a wheel 112, journaled in a bearing 113, and thence into the rear end of the trough 107, as before stated. The tape 109 is propelled in the direction indicated by the arrow thereon in Fig. 2 from the main shaft 4 through the driving-wheel 108, which is geared thereto, as shown. On the frame 1, back of the rear tape-wheel 112, is journaled in a fixed standard-bearing 114 a reel 115, on which is placed the continuous wrapper-strip 116, usually of paper and like that generally employed for wrapping the continuous filler-rod of tobacco in machines of this class. The wrapping-strip 116 is introduced with and over the endless tape 109 into the trough 107, and is thus carried forward with and by the underlying tape through the trough 107.

At the point marked 37 37 in Fig. 35, where the tape and overlying wrapper-strip substantially enter the trough 107, the trough is covered and forms simply a flat slit, as shown in Fig. 37, in which the tape and wrapper-strip lie flat. From this point the thin slit gradually curves upward at the sides to the points marked 38 38 and 39 39 in Fig. 35, as shown in Figs. 38 and 39, compelling the tape and wrapper-strip to assume a like furrowed or U form. At or about the point marked 39 39 in Fig. 35, where the formed filler leaves the forming-wheels 69 and 70, the cover of the trough 107 is formed with a longitudinal furrow 117, which sinks downward by a short incline until it joins the slit or trough 107 and the tape and wrapper-strip traveling therein, so that the formed filler, propelled by and emerging from the forming-wheels 69 and 70, moves and falls by gravity along the inclined furrow 117 upon the already-furrowed wrapper-strip 116 on the tape 109. At this point, substantially where marked 40 40 in Fig. 35 and as shown in Fig. 40, the side edges of the furrowed wrapper-strip and tape are still confined by downwardly-opening grooves 118. From this point the trough 107 and the tape and wrapper-strip contract and curve gradually around the filler-rod until at the point marked 41 41 in Fig. 35 and as shown in Fig. 41 the filler-rod is closely confined on the sides and bottom by the wrapper-strip and on the top by the arched capping 119, one edge of the wrapper-strip and tape being confined in an arched groove 120 and the other edge in a vertical groove 121. The filler-rod is thus at this point closely confined on all sides in its final form. The distance between the forming-wheels and this point is so short and the progressive movement of the filler so rapid that with this construction practically no expansion or alteration in the form of the filler-rod occurs from the time it leaves the forming-wheels until it is again positively confined on all sides, as described.

At the point marked 42 42 in Fig. 35 and as shown in Fig. 42, the form of the trough changing, as before, gradually, the vertical groove 121 opens upward through a depression 122 in the cover of the trough, exposing the inside of the edge portion of the wrapper-strip to the periphery of a paste-wheel 123, overlying the depressed portion 122 of the trough-cover and turning on a vertical shaft 124. The paste-wheel is rotated peripherally at the same rate of speed as the wrapper-strip 116 travels, preferably by means hereinafter described, and the narrow periphery of the paste-wheel is coated with paste, preferably in a manner hereinafter described, so that the edge portion of the wrapper-strip as it runs along the edge of the paste-wheel 123 is itself coated with a very thin margin of paste.

At or about the point marked 43 43 in Fig. 35 and as shown in Fig. 43 the trough, gradually changing its form, opens through a slot 125 at the side, and the edge of the capping 126 forms a separator or stripper, which strips the tape 109 from off the downturned or unpasted edge of the wrapper-strip 116. At the same time the pasted edge of the wrapper-strip and the outlying tape enter a groove 127, which, as shown in Figs. 44 and 45, gradually curves downward, overlapping the other edge of the wrapper-strip until it joins the trough proper, forming a tube, and thereby presses the pasted edge of the wrapper-strip upon the underlapping other edge and causes the two edges to adhere. The continuous cigarette is thus formed, and as it emerges from the forward end of the trough 107 the endless tape is stripped therefrom and runs downward around its driving-wheel, while the continuous cigarette runs into a funnel-mouthed guide-tube 128, which leads to the cutting mechanism hereinafter described.

For driving the paste-wheel and applying the paste properly thereto any suitable means may be employed. I prefer, however, to employ the mechanism shown in the drawings, which will now be described.

As best shown in Figs. 18 to 26, inclusive, the paste-wheel 123 is driven at the required speed in the direction indicated by the arrow in Fig. 2 by means of a worm-wheel 130 on its shaft 124 gearing with a worm 131 on the main driving-shaft 4. The paste-wheel and its shaft 124, together with the paste-wheel-driving mechanism and paste-applying mechanism, are mounted on a frame 132, which is mounted to swing laterally to and from the wrapping and pasting trough 107 upon stout hinges 133, so that the paste-wheel and its associated parts can be swung outward when desired away from the wrapper-strip and simultaneously disengages from the driving-shaft 4 for the purpose of inspection or repairs or for any other reason.

When the paste mechanism is swung inward to apply the paste to the wrapper-strip 116, as shown in the drawings, it is locked in such position by means of a catch-bar 134, pivoted to the main frame 1 and having an adjustable head 135, which is engaged with a forked projection 136 on the paste-frame 132 and screwed up against such forked projection until the paste-frame and mechanism are secured immovably in operating position.

The paste is automatically deposited upon the edge of the paste-wheel 123 as follows: In the frame 132 is rigidly supported a vertical cylindrical paste-reservoir 137, containing a plunger 138, which is fixed to the upper end of a plunger-rod 139, threaded from end to end and fitted to screw lengthwise through a worm-wheel 140 as a nut. The worm-wheel 140 is mounted to revolve between bearings 141 in chamber 142 on the lower end of the paste-reservoir 137 and gears with a worm 143 on a shaft 144, journaled in the paste-frame 132. The threaded plunger-rod 139 has a straight groove 145 extending from end to end, in which groove normally rides a tongue 146, having a handled shank 147, mounted to slide in a guide 148, so that the plunger-rod is normally prevented from turning while permitted to travel longitudinally and is caused by the rotation of the worm-wheel 140, worm 143, and shaft 144 to rise with the plunger 138 in the paste-reservoir, and thus slowly force the paste which is initially placed therein and may be of the kind usually employed for this purpose upward in the reservoir.

In the wall of the paste-reservoir 137, at its upper end, is an opening 149, through which the paste under the pressure of the plunger passes into a closed chamber 150 in the middle of a chest 151, fixed on the paste-reservoir and having a removable cover 152. In opposite ends of the chest 151 are screwed stuffing-boxes 153 and 154, through which extends and in which is fitted closely, but to rotate, a long tube 155, whose opposite ends project from said stuffing-boxes 153 and 154. In the tube 155 is fitted to rotate a spindle 156, whose ends likewise project from the ends of the tube 155 and whose forward head is formed with an inner cone 157, fitting closely the truncated conical mouth 158 of the tube 155 and with an outer cone 159, forming a continuation of the conical exterior 160 of the tube 155 and fitting and lying therewith along the periphery of the paste-wheel 123. This specific arrangement of paste-cone and paste-wheel is shown greatly enlarged in Fig. 24; but the cone 159 is not essential, it being sufficient to provide an annular orifice merely. Apertures 161 are formed through the tube 155 in the paste-chamber 150, through which the paste gains access to the inner spindle 156, and from these apertures to its conical head the spindle is formed with a thread or worm 162, by which as the spindle 156 is rotated within the tube 155 the paste is fed forward within the tube 155 until it is ground and issues from between the conical mouth 158 of the tube and the inner cone 157 of the spindle, and is thence deposited by the rotated head and mouth in a narrow even strip or margin along the rounded periphery of the rotating paste-wheel, by which it is transferred to the wrapper-strip 116, as before described. It is desirable that the spindle 156 and the tube 155 should be revoluble both in respect to the paste-reservoir and to each other, and they are here rotated in opposite directions as follows: On the rear end of the tube 155 is a spur-wheel 163 and on the rear end of the spindle 156 a smaller spur-wheel 164. The spur-wheel 163 gears with a spur-wheel 165 on a horizontal shaft 166 and the spur-wheel 164 with a spur-wheel 167, which in turn gears with a spur-wheel 168 on the said shaft 166. The shaft 166 is journaled in bearings 169 on the paste-frame 132 and has a bevel gear-wheel 170 engaging with a bevel gear-wheel 171 on the before-described vertical driven shaft 124, by which, therefore, the paste-spindle and tube are rotated as described.

Between suitable bearings on the spur-wheels 163 and 164 is interposed a convex plate-spring 172, which tends to press said spur-wheels apart, and therefore to draw the inner paste-cone 157 into the conical mouth 158 of the paste-tube. To oppose the pressure of the spring 172, and thus project the paste-cone 157 farther from the paste-tube 155, a hand-screw 173 is mounted to turn in a bracket 174 on the paste-frame against a bearing 175 on the rear end of the spindle 156, so that by turning said screw 173 the fine opening between the mouth of the tube 155 and the inner cone 157 of the spindle can be adjusted, and thus the flow of paste to the paste-wheel regulated at will.

The bracket 174, carrying the flow-regulating screw 173, is mounted on a pivot 176, screwed into the paste-frame, and is locked normally in position by a stud 177 on said bracket entering a socket 178 in the paste-frame. By unscrewing the pivot 176 the stud can be withdrawn from the socket 178 and the bracket then swung aside on its pivot 176 to permit the spindle and tube to be withdrawn from or replaced in their stuffing-boxes for inspection, cleaning, repairs, or any other purpose.

The shaft 144, by which the paste-plunger 139 is forced upward, as before described, is driven as follows: On said shaft 144 is fixed a friction clutch-wheel 179, which is intermittently engaged and rotated by a clutch-pawl 180, pivoted and resting against a stop 181 on a vibrating lever 182. The lever 182 is pivoted on the shaft 144 and has on its upper end a forked follower 183, between the branches of which plays an eccentric 184 on the before-described driven shaft 166, so that by the rotation of said shaft 166 the lever 182 is vibrated, the friction clutch-wheel 179 rotated step by step, and the paste-plunger fed slowly upward.

The pawl 180 is formed with a disengaging-arm 185, which is connected by a rod 186 with one end of a lever 187, which is pivoted to play vertically on a bearing 188 on the paste-frame, and is also connected to a plunger-rod 189, which is guided vertically in the bearing 188 and has its lower end resting on a bearing 190, carried by a rubber or other yielding diaphragm 191 or pressure-head and closing the upper end of the paste-reservoir 137. By this arrangement if the pressure of the paste in the reservoir due to the ascending plunger 138 becomes excessive the diaphragm 191 yields upwardly, raises the plunger-rod 189, lever 187, and connecting-rod 186, and this raises and disengages the pawl 180 from the friction clutch-wheel 179, so as to temporarily arrest the movement of the paste-plunger 138 until the pressure of the paste within the reservoir falling permits the pawl 180 to again engage and rotate the friction clutch-wheel 179. The pressure under which the paste is supplied to the paste-wheel is thus automatically maintained uniform or substantially uniform.

On the top of the yielding diaphragm 191 bears a spring 192, which bears upwardly against a bearing 193, formed on a sleeve 194, which surrounds the plunger-rod 189, screws vertically in the bearing 188, and has a wheel for turning it, so that by adjusting said bearing 193 the resistance of the diaphragm 191, and hence the pressure under which the paste is supplied, can be regulated to any degree desired.

On the lower end of the threaded paste plunger-rod 139 is fixed a hand-wheel 195, so that by withdrawing the before-described tongue 146 from the groove in the plunger-rod 139 said plunger-rod can be screwed in the worm-wheel 140 as a nut, independently of the automatic feeding mechanism, to lower or elevate the plunger in the paste-reservoir for filling or cleaning said reservoir or for establishing the desired pressure therein, or for any other purpose. The diaphragm 191 is made removable from the top of the reservoir for these same purposes, it being secured in place therein by a bolted ring 197 and attached to and supported by a spider 198, having arms which are stopped by said ring 197 to limit the depression of the diaphragm.

In Fig. 25 I have shown in detail the mode in which the upper hinge-pivot 200, carrying the entire paste-frame and paste-wheel, is held in a screw-socket 201, adjustable vertically in the main frame 1, so that by turning said socket the paste-wheel can be adjusted vertically to run accurately on the edge of the wrapper-strip 116, as before described.

I have thus described the mechanism by which the continuous-wrapped cigarette is formed and fed through the before-mentioned guide-tube 128. To sever this continuous cigarette into short sections of equal length forming the individual marketable cigarettes, I employ, by preference, the cutting mechanism shown and described, as follows, although any other suitable means might be employed for the purpose: The cutting mechanism shown in Figs. 27, 28, and 29, in another form in Figs. 30 to 34, and indicated in part only in Figs. 1 and 2, consists, primarily, of a revolving cutting-blade revolving on an axis inclined to the line of the continuous cigarette and whose sharpened edge is of helical form, having a pitch equal to the length of the individual sections or cigarettes. The radial distance of the cutting edge from the axis of revolution is increased progressively from the point where the blade first touches the continuous cigarette to the point where the cut through the continuous cigarette is completed. Therefore as the cutting-blade is revolved on its axis the cutting edge is advanced radially and progressively a distance equal to the diameter of the cigarette. The cutting-blade will be described as helical and as of unequal radius. The increase of radius of the cutting-blade in a transverse plane of severance through any point of the continuous cigarette may be figuratively referred to as the expansion of the blade by the radial advancement of the cutting edge of the blade, and in this sense by its expansion from its axis across the continuous cigarette it will sever the same, and at the same time, owing to its spiral form and pitch, it will have a progressive movement exactly equal to that of the continuous cigarette, and thus be stationary relatively to the length thereof, so as not to interfere with or hinder the free movement of the continuous cigarette.

In Figs. 27, 28, and 29 the blade 202 is shown bolted to a rigid spiral frame or body 203, fixed on the main driving-shaft 4, and surrounded by a circular guard 204, supported on the main frame 1. The portion 205 of the edge of the blade 202 extends substantially to the nearer side of the continuous cigarette 206, and the portion 207 of the edge of the blade extends substantially to or slightly beyond the farther side of said cigarette, while the pitch of said edge is, as before stated, exactly equal to the desired length of the individual sections or cigarettes. Thus as the continuous cigarette, suitably guided and supported, passes through the tube 128 across the edge 205 of the blade 202 the helical blade, revolving, cuts through the cigarette while moving forward therewith, and the cutting edge then again meets the next severing-point of the cigarette and severs it at that point. The motion of this cutter being a rotary one and as it can be perfectly balanced, almost any desired speed of rotation can be obtained without undue vibration. As I can operate the cigarette forming and wrapping mechanism at a very high rate of speed, I am enabled to produce perfect finished cigarettes with great rapidity.

For supporting and guiding the continuous cigarette during the operation of the cutting-blade 202 any suitable means may be employed. I prefer, however, to employ the mechanism shown and described as follows: In bearings 208 and 209, supported on the frame 1, are journaled loose belt-wheels 210 and 211, around which runs an endless flexible carrier 212, consisting of pivoted links, each formed with a longitudinal trough 214 and a transverse slot 215, the troughs opening outwardly and fitted to receive the continuous cigarette and the successive slots 215 fitted to receive the edge of the cutting-blade 202 and separated by intervals equal to the pitch of said blade. Thus as the blade is revolved it enters the successive slots 215 successively and propels the carrier, with its troughs 214, in the direction indicated by the arrow in Fig. 27 and at the same rate as the continuous cigarette. The moving continuous cigarette enters and rests (relatively) in the troughs 214 as the same aline themselves in front of the cigarette, and thus the blade 202, working through the transverse slots 215, severs the continuous cigarette evenly and cleanly into the desired sections or cigarettes, which then fall from the carrier into a suitable receptacle.

To perfect and maintain the alinement of the carrier-troughs in front of the continuous cigarette, I extend the pivots 216 of the carrier-links laterally and guide them in a fixed longitudinal grooved rail 217.

In Figs. 30 to 34, I have shown the cutter-blade 218 of segmental helical form instead of the full circular form shown in Figs. 27, 28, and 29, the segmental blade 218 being supported at its ends adjustably on the cutter-body 219 by means of radial adjusting screws and nuts 220 for adjusting its helical cutting edge to a nicety. I have also shown the carrier-links formed with transverse slots 221 independent of the severing-slots 222, in which the blade rides, and the cutter-body with a helical edge or flange 223 apart from the cutting edge to engage with the slots 221 and propel the carrier. This latter form of cutter-blade and carrier I now prefer to the form shown in Figs. 27, 28, and 29.

To keep the cutting-blade 218 automatically sharpened and avoid the necessity of stopping the machine for that purpose, I prefer to use the devices shown in Figs. 30 to 34, inclusive, and described as follows, although any other means suited to the purpose may be employed: To the sides of two or more of the carrier-links 224 I attach blocks 225, carrying longitudinally-arranged cylindrical boxes 226, in which are fitted plungers 227, carrying on their heads sharpening-blocks 228, of emery or other suitable composition or substances, in positions to bear against, abrade, and sharpen the edge of the cutter-blade 218 from opposite sides. In Fig. 31 the cutter-blade 218 is shown in one of the slots 222 bearing against a wall of the slot on one side and against a sharpening-block 228 on the other side. Around the shank 229 of each plunger 227 is coiled a spring 230, and said plunger passes through a segmental slot 231 in a handled cam-plate 232, pivoted to the rear of the block 225, and has adjusting-nuts 233, screwed on its end outside said cam-plate. Thus when the cam-plate 232 is swung in the direction of the arrow shown in Fig. 32 the spring will be permitted to project the sharpening-block 228 into the path of the blade to sharpen the same; but when the cam-plate 232 is swung to the reverse position it will press rearward the nuts 233, and thus retract the plunger and sharpening-block out of the path of the blade.

Experience has shown that the continuous cigarette in its process of formation will drag and fall back behind the various forming and propelling mechanisms, and thus not keep pace with the cutting mechanism, whereby the cigarette-sections will vary in length. This is troublesome, particularly when the continuous wrapper is stamped or supplied with mouthpiece material at intervals. I have therefore provided mechanism (shown in Figs. 46, 47, 48, and 49) for retreating a rotary cutter having a periodic action—that is, having a cutting edge that is periodically brought into cutting position by the rotation thereof, as is the case with the rotary cutters hereinbefore described—relatively to its driving-shaft 4 when this retardation of the cigarette occurs without stopping the machine, so that the continuous cigarette will continue to be cut at the proper points. This so-called "cutter-retreating mechanism" consists of a sleeve 235, on which the cutter-body 219 is fixed by a nut 236 and spline 237, and which sleeve is mounted to turn loosely on the driving-shaft 4, as well as in the bearing 3. On the other end of the sleeve 235 is formed a double-crown ratchet-wheel 236½, having the ratchet-teeth 237½ and 238 on its opposite edges staggered relatively to each other, as best shown in the enlarged detail view Fig. 49. On the shaft 4 is fitted to slide lengthwise a sleeve 239, which, however, is compelled to rotate with the shaft 4 by means of the connecting-spline 240 and groove 241, and to said sleeve is rigidly attached on opposite sides longitudinal arms 242, having slots 243, through which the toothed rim of the double ratchet-wheel 236½ passes. In said arms 242 on opposite sides of the slots 243 are formed what I shall call "fixed" pawl-teeth 244 and 245 to engage alternately the teeth 237½ and 238, respectively, of the ratchet-wheel 236½. A handle-lever 246 is pivoted to the frame 1 and has pins riding in a peripheral groove 246½ of the rotating sleeve 239, so that by rocking said lever in the direction of the length of the shaft 4 the sleeve 239 and with it the teeth 244 and 245 can be reciprocated to bring either the pawl-teeth 244 or 245 into locking engagement with the ratchet-wheel 236½. By this arrangement, which I call an "escapement-clutch," the cutter-carrying sleeve 235 is always clutched by one set of engaging ratchet and pawl teeth to the shaft 4 and the cutter thus rotated therewith; but when, as in the case before mentioned, it is desired to retreat the cutter behind the shaft 4 by simply rocking the lever 246 the required number of times lengthwise of the shaft 4 the pawl-teeth 244 and 245 alternately engage the opposite ratchet-teeth 237½ and 238, which being staggered permit the ratchet-wheel 236½ and attached cutter to be set relatively to the pawl-carrying sleeve 239 and shaft 4, it being moved the distance of one tooth with each stroke of lever 246, thus regulating the point of severance relatively to the imprint on the cigarette.

It will be noted that in the mechanism above described the cutter is revoluble in respect to its driving-shaft and that means such as the lever 246 and parts connected thereto, are provided for adjustably rotating the cutter in respect to the shaft and for holding the cutter in its adjusted position.

It will be noticed that the continuous cigarette is brought into the path of the spiral cutter-blade in a line oblique to the axis of the shaft 4 and cutter, so that the line of the cigarette will be substantially perpendicular to the inclined helical edge of the cutter-blade and the cigarette thus severed at exactly right angles to its length.

It is obvious that many changes can be made without departing from the spirit of my invention. Therefore, without limiting myself to the details shown,

What I claim, and desire to secure by Letters Patent of the United States, is—

1. In filler-forming mechanism for cigarette-machines, the combination, with a belt-carrier to convey a stream of filler, and means adjoining the belt-carrier for compressing and forming said filler into a continuous rod, of a rod-wrapping trough leading obliquely from the side of the belt-carrier at the point adjoined by said compressing and forming means, to receive the continuous rod from the filler-forming means.

2. In filler-forming mechanism for cigarette-machines, the combination, with a belt-carrier to convey a stream of filler, and a rod-wrapping trough leading obliquely from the side of the belt-carrier, of a pair of tangential grooved forming-wheels arranged with the plane of their axes obliquely across the belt-carrier and in a line transverse to the wrapping-trough to discharge the formed filler at the side of the belt-carrier into the wrapping-trough, and means for compressing and guiding the stream of filler on the belt-carrier to and between the forming-wheels.

3. In filler-forming mechanism for cigarette-machines, the combination, with a belt-carrier to convey a stream of filler, a rod-wrapping trough leading obliquely from the side of the belt-carrier, a pair of tangential grooved forming-wheels arranged with the plane of their axes obliquely across the belt-carrier and in a line transverse to said wrapping-trough to discharge the formed filler into the wrapping-trough, and filler-confining means extending along the sides of the belt-carrier to the forming-wheels, of a revoluble repressing and diverting disk covering the belt-carrier to the forming-wheels and journaled to move laterally toward said wheels substantially in the oblique line of the wrapping devices, means for compressing and guiding the stream of filler on the belt-carrier beneath said diverting-disk, and means for rotating the diverting-disk, at substantially the same speed as the underlying filler and belt-carrier.

4. In filler forming and wrapping mechanism for cigarette-machines, the combination, with a belt-carrier to convey a stream of filler, and means adjoining the belt-carrier for compressing and forming said filler into a continuous rod and discharging said rod obliquely off from the belt-carrier, of a wrapping-trough extending underneath said belt-carrier and obliquely with respect thereto both rearwardly and forwardly from said rod-discharging point, said trough being formed back of said rod-discharging point with a gradually-deepening U-shaped slit in which the wrapping tape and strip run and means whereby they are formed into a furrow where they receive and thus confine the compressed filler-rod.

5. In filler forming and wrapping mechanism for cigarette-machines, the combination, with a pair of grooved forming-wheels and means adjoining and in front of the forming-wheels for carrying, compressing, and guiding a stream of filler therebetween, of a wrapping-trough extending both rearwardly and forwardly beneath said forming-wheels, and formed back of the exit of said wheels with a gradually-deepening U-shaped slit in which the wrapping tape and strip run and whereby they are formed into a furrow where they receive and thus confine the compressed and formed filler-rod.

6. In filler forming and wrapping mechanism for cigarette-machines, the combination, with the filler-forming means whereby a continuous filler-rod is formed and discharged, of a wrapping-tape, a wrapping-trough formed with a U-shaped slit or channel in which the wrapping tape and strip run and whereby they are turned to U shape, said trough having an inclined furrow located above the wrapping-tape leading from the discharge of the rod-forming means downward into the underrunning wrapping tape and strip, and U-shaped slit.

7. The combination, with the paste-wheel, of a paste-tube having a mouth rotatable on the periphery of the paste-wheel, a spindle having a head fitted and rotatable in said mouth and also rotatable on the periphery of the paste-wheel, means for supplying the paste under pressure into the paste-tube and between its mouth and said spindle-head onto the paste-wheel, and means for rotating the paste-tube and the spindle relatively therein.

8. The combination, with the paste-wheel, of a paste-tube having a conical mouth rotatable on the paste-wheel, a spindle having an inner cone on its head fitted and rotatable in said tube-mouth and on the paste-wheel, means for supplying paste under pressure into the paste-tube, and means for rotating the tube and the spindle relatively therein.

9. The combination, with the paste-wheel, of a paste-tube having an end mouth rotatable on the paste-wheel, a spindle having a paste-conveying worm fitted and rotatable in said tube and a head fitted and rotatable in the mouth of said tube and rotatable on the paste-wheel, means for supplying paste into said tube and on said worm, and means for rotating the paste-tube and the spindle therein.

10. The combination, with the paste-wheel, of a paste-tube having a mouth rotatable on the paste-wheel, a spindle fitted to rotate and move lengthwise in said tube and having a head fitted in the mouth of the tube and rotatable on the paste-wheel, means for adjusting the spindle and its head axially in the tube, means for rotating the tube and the spindle, and means for supplying paste into the tube.

11. The combination, with the paste-wheel, the paster-frame, the paste-tube bearing against the paste-wheel and rotatable and adjustable lengthwise in the paste-frame, the spindle having a head closing the mouth of the tube and bearing against the paste-wheel and rotatable and adjustable lengthwise in the paste-tube, means for rotating the tube and spindle, and means for supplying paste to the tube, of an axially-pressing spring between the bearings on the tube and spindle, and an adjusting-screw on the spindle for work against a bearing on the spindle for adjusting the spindle and tube axially.

12. The combination, with a paste-plunger and reservoir, a paste-chest opening therefrom, a paste-tube rotatable in the paste-chest and having paste-admission openings within the paste-chest, a spindle rotatable in the paste-tube, and a paste-wheel, said tube having a mouth, and said spindle a mouth-closing head, rotatable on the paste-wheel, and means for operating these parts in the manner set forth.

13. The combination, with the paste-reservoir having a paste-exit, a paste-forcing plunger in the reservoir, and means for propelling the plunger, of a yielding pressure-head in the paste-reservoir, and connections between the pressure-head and the plunger-propelling means, whereby an excessive movement of the pressure-head disengages the plunger from its propelling means and reversely.

14. The combination, with the paste-reservoir having a paste-exit, a paste-forcing plunger in the reservoir, and means for propelling the plunger including a clutch-wheel and pawl, of a yielding pressure-head in the paste-reservoir, a plunger-rod bearing on the pressure-head, and connections between said diaphragm plunger-rod and said pawl whereby an excessive movement of the pressure-head disengages the pawl from the plunger-propelling clutch-wheel and reversely.

15. The combination, with the paste-reservoir having a paste-exit, a paste-plunger in the reservoir, and means for propelling the paste-plunger, of a yielding pressure-head in the reservoir, a spring reinforcing the pressure-head, means for altering the compression of said spring, and operating connections between said pressure-head and the plunger-propelling means, whereby the movement of the pressure-head governs the plunger-propelling means.

16. The combination with the rotatable cutter and its driving-shaft, the cutter having a cutting edge which is brought into cutting position by the rotation of the cutter, of means, substantially as described, for adjustably rotating the cutter relative to the shaft and for holding the parts in their adjusted position, substantially as described.

17. In a cigarette-machine, the combination with a cutter and a driving-shaft, the cutter having a cutting edge which is brought into cutting position by the rotation of the cutter, of a clutch for connecting the cutter and shaft, consisting of a wheel rotating with the cutter and having two relatively-staggered rows of teeth, and of a toothed section